(12) United States Patent
Schwab et al.

(10) Patent No.: US 10,888,838 B2
(45) Date of Patent: Jan. 12, 2021

(54) POROUS FILMS COMPRISING METAL-ORGANIC FRAMEWORK MATERIALS

(71) Applicant: BASF SE, Ludwigshafen (DE)

(72) Inventors: Matthias G. Schwab, Mannheim (DE); Stefan Maurer, Shanghai (CN); Waldemar Bartuli, Neustadt (DE); Ulrich Müller, Neustadt (DE)

(73) Assignee: BASF SE, Ludwigshafen am Rhein (DE)

( * ) Notice: Subject to any disclaimer, the term of this patent is extended or adjusted under 35 U.S.C. 154(b) by 742 days.

(21) Appl. No.: 15/129,222

(22) PCT Filed: Mar. 24, 2015

(86) PCT No.: PCT/EP2015/056242
§ 371 (c)(1),
(2) Date: Sep. 26, 2016

(87) PCT Pub. No.: WO2015/144695
PCT Pub. Date: Oct. 1, 2015

(65) Prior Publication Data
US 2018/0178191 A1    Jun. 28, 2018

(30) Foreign Application Priority Data

Mar. 27, 2014   (EP) .................................. 14162018

(51) Int. Cl.
*C03C 10/14* (2006.01)
*B01J 20/22* (2006.01)
(Continued)

(52) U.S. Cl.
CPC ........... *B01J 20/226* (2013.01); *B01J 20/261* (2013.01); *B01J 20/264* (2013.01);
(Continued)

(58) Field of Classification Search
CPC ................ B01J 20/226; B01J 20/28059; B01J 20/28033; B01J 20/28057; B01J 20/264;
(Continued)

(56) References Cited

U.S. PATENT DOCUMENTS 4,153,661 A    5/1979  Ree et al.
4,379,772 A    4/1983  Solomon et al.
(Continued)

FOREIGN PATENT DOCUMENTS

DE           10111230 A1   9/2002
DE        102005000938 A1   7/2006
(Continued)

OTHER PUBLICATIONS

Shekhah et al., MOF Thin Films: Existing and Future Applications, *Chem. Soc. Rev.*, vol. 40, pp. 1081-1106 (2011).
(Continued)

*Primary Examiner* — Haytham Soliman
(74) *Attorney, Agent, or Firm* — Faegre Drinker Biddle & Reath LLP

(57) ABSTRACT

The present invention relates to porous films comprising (A) from 51 wt.-% to 99.9 wt.-% based on the total weight of the film of at least one porous metal-organic framework material, the material comprising at least one at least bidentate organic compound coordinated to at least one metal ion; (B) from 0.1 wt.-% to 49 wt.-% based on the total weight of the film of at least one fibrillated fluoropolymer; and (C) 0 wt.-% to 48.9 wt.-% based on the total weight of the film of an additive component. The invention further relates to a composition for preparing such a film and its use.

14 Claims, 3 Drawing Sheets

(51) Int. Cl.
  *B01J 20/26* (2006.01)
  *B01J 31/16* (2006.01)
  *B01J 20/28* (2006.01)
  *C08J 5/18* (2006.01)
  *C08G 83/00* (2006.01)

(52) U.S. Cl.
  CPC ... *B01J 20/28033* (2013.01); *B01J 20/28057* (2013.01); *B01J 20/28059* (2013.01); *B01J 31/1691* (2013.01); *C08J 5/18* (2013.01); *B01J 2220/44* (2013.01); *C08G 83/001* (2013.01); *C08J 2300/00* (2013.01); *C08J 2427/12* (2013.01)

(58) Field of Classification Search
  CPC .. B01J 20/261; B01J 31/1691; B01J 2220/44; C08J 5/18; C08J 2427/12; C08J 2300/00; C08G 83/001
  USPC .......................................................... 502/4
  See application file for complete search history.

(56) References Cited

U.S. PATENT DOCUMENTS

| | | | |
|---|---|---|---|
| 5,648,508 | A | 7/1997 | Yaghi |
| 6,359,769 | B1 | 3/2002 | Mushiake et al. |
| 6,631,074 | B2 | 10/2003 | Bendale et al. |
| 6,929,679 | B2 | 8/2005 | Müller et al. |
| 7,175,783 | B2 | 2/2007 | Curran |
| 7,534,303 | B2 | 5/2009 | Mueller et al. |
| 7,815,716 | B2 | 10/2010 | Mueller et al. |
| 8,163,949 | B2 | 4/2012 | Mueller et al. |
| 8,569,407 | B2 | 10/2013 | Leung et al. |
| 8,676,126 | B2 | 3/2014 | Ahn et al. |
| 2003/0219587 | A1 | 11/2003 | Pekala |
| 2004/0081611 | A1 | 4/2004 | Muller et al. |
| 2005/0266298 | A1 | 12/2005 | Mitchell et al. |
| 2006/0185336 | A1 | 8/2006 | Nakano et al. |
| 2008/0141858 | A1 | 6/2008 | Liu et al. |
| 2008/0190289 | A1 | 8/2008 | Muller et al. |
| 2009/0183996 | A1 | 7/2009 | Richter et al. |
| 2010/0014215 | A1 | 1/2010 | Zhong et al. |
| 2010/0166644 | A1 | 7/2010 | Schubert et al. |
| 2011/0260100 | A1* | 10/2011 | Trukhan .................. H01M 4/13 252/182.1 |
| 2012/0077092 | A1* | 3/2012 | Lee ....................... C08J 5/2206 429/307 |
| 2012/0134070 | A1* | 5/2012 | Gadkaree ............. C01B 32/342 361/502 |
| 2013/0313193 | A1 | 11/2013 | Nair et al. |

FOREIGN PATENT DOCUMENTS

| | | |
|---|---|---|
| DE | 102005012087 A1 | 9/2006 |
| DE | 102005022844 A1 | 11/2006 |
| DE | 102005053430 A1 | 5/2007 |
| EP | 0790253 A2 | 8/1997 |
| EP | 1674555 A1 | 6/2006 |
| JP | H105545 A | 1/1998 |
| JP | 2011109115 A | 6/2011 |
| WO | WO-2003035717 A1 | 5/2003 |
| WO | WO-2003064030 A1 | 8/2003 |
| WO | WO-2003101975 A1 | 12/2003 |
| WO | WO-2003102000 A1 | 12/2003 |
| WO | WO-2004037895 A1 | 5/2004 |
| WO | WO-200503069 A2 | 1/2005 |
| WO | WO-2005003622 A1 | 1/2005 |
| WO | WO-2005049484 A1 | 6/2005 |
| WO | WO-2005049892 A1 | 6/2005 |
| WO | WO-2006050898 A1 | 5/2006 |
| WO | WO-2006089908 A1 | 8/2006 |
| WO | WO-2007023134 A1 | 3/2007 |
| WO | WO-2007054581 A2 | 5/2007 |
| WO | WO-2007131955 A1 | 11/2007 |
| WO | WO-2010077030 A2 | 7/2010 |
| WO | WO-2010106105 A2 | 9/2010 |

OTHER PUBLICATIONS

Lee et al., "Layer-by-Layer Deposition and Photovoltaic Property of Ru-based Metal-Organic Frameworks", RSC Adv., vol. 4, pp. 12037-12042 (2014).

Salmi et al., "Studies on Atomic Layer Deposition of MOF-5 Thin Films", *Microporous and Mesoporous Materials*, vol. 182, pp. 147-154 (2013).

Wannapaiboon et al., "Liquid Phase Heteroepitaxial Growth of Moisture-Tolerant MOF-5 Isotype Thin Films and Assessment of the Sorption Properties by Quartz Crystal Microbalance", *Adv. Funct. Mater.*, vol. 24, pp. 2696-2705 (2014).

Marti et al., "Fabrication of Oriented Silver-Functionalized RPM3 Films for the Selective Detection of Olefins", *American Chemical Society, Langmuir*, vol. 29, pp. 5927-5936 (2013).

Guo et al., "Fabrication of ITO Glass Supported Tb-MOF Film for Sensing Organic Solvent", *Inorganic Chemistry Communications*, vol. 41, pp. 29-32 (2014).

Ahrenholtz et al., "Solvothermal Preparation of an Electrocatalytic Metalloprophyrin MOF Thin Film and its Redox Hopping Charge-Transfer Mechanism", *J. Am. Chem. Soc.*, vol. 136, pp. 2464-2472 (2014).

Yeonshick et al., "Rapid Fabrication of Metal Organic Framework Thin Films Using Microwave-Induced Thermal Deposition", *Chem. Commun.*, pp. 2441-2443 (2008).

Zhu et al., A Novel Highly Luminescent LnMOF Film: A Convenient Sensor for $Hg^{2+}$ Detecting, *J. Mater. Chem. A*, vol. 1, pp. 11312-11319 (2013).

O'Keefe et al., "Section 1: Tutorial Frameworks for Extended Solids: Geometrical Design Principles", *Journal of Solid State Chemistry*, vol. 152, pp. 3-20 (2000).

Li et al., "Design and Synthesis of an Execeptionally Stable and Highly Porous Metal-Organic Framework", *Nature*, vol. 402, pp. 276-279 (1999).

Eddaoudi et al., "Design and Synthesis of Metal-Carboxylate Frameworks with Permanent Microporosity", *Topics in Catalysts*, vol. 9, pp. 105-111 (1999).

Chen et al., "Interwoven Metal-Organic Framework on a Periodic Minimal Surface with Extra-Large Pores", *Science*, vol. 291, pp. 1021-1023 (2011).

Sudik et al., "Design, Synthesis, Structure, and Gas ($N_2$, Ar, $CO_2$, $CH_4$, and $H_2$) Sorption Properties of Porous Metal-Organic Tetrahedral and Heterocuboidal Polyhedra", *J. Am. Chem. Soc.*, vol. 127, pp. 7110-7118 (2005).

Sing et al., "Reporting Physisorption Data for Gas/Solid Systems with Special Reference to the Determination of Surface Area and Porosity", *Pure & Appl. Chem.*, vol. 57, No. 4, pp. 603-619 (1985).

Kreno et al., "Metal-Organic Framework Materials as Chemical Sensors", *Chem. Rev.*, vol. 112, pp. 1105-1125 (2012).

International Preliminary Examination Report with Annexes for PCT/EP2015/056242 completed May 24, 2016.

International Search Report for PCT/EP2015/056242 dated Jun. 11, 2015.

\* cited by examiner

POROUS FILMS COMPRISING METAL-ORGANIC FRAMEWORK MATERIALS

CROSS-REFERENCE TO RELATED APPLICATIONS

This application is a national stage application (under 35 U.S.C. § 371) of PCT/EP2015/056242, filed Mar. 24, 2015, which claims benefit of European Application No. 14162018.7, filed Mar. 27, 2014, both of which are incorporated herein by reference in their entirety.

The present invention relates to porous films comprising at least one porous metal-organic framework material (MOF). The invention further relates to a composition for preparing such a film and its use.

Porous metal-organic framework materials are well known to be suitable for many applications including gas storage. Dependent on the application metal-organic framework materials can be used as powder and can thus directly be used after preparation. Another suitable form includes shaped bodies (see e.g. WO 03/102000 A1, WO 2006/050898 A1).

In particular films of metal-organic framework materials are highly suitable when used, e.g., in sensor technologies.

Here two groups of films have to be considered independently. A first group refers to films, where metal organic framework material is a minor component of a polymer film. An example is described in WO 2010/106105 A2, where a biodegradable material is disclosed. A second group refers to films of pure metal-organic framework material or at least with MOF as major component.

Also for the second group the preparation of such films is described in the literature. A review of methods for the fabrication of MOF thin films and application of such films is given by O. Shekhah et al., Chem. Soc. Rev., 2011, 40, 1081-1106.

Accordingly examples for preparation methods are layer-by-layer deposition (D. Y. Lee et al., RSC Advances (2014), 4(23), 12037-12042), atomic layer deposition (L. D. Salmi et al., Microporous and Mesoporous Materials (2013), 182, 147-154), liquid phase epitaxial (LPE) deposition (S. Wannapaiboon at al., Advanced Functional Materials, first published online 20 Dec. 2013), pulsed laser deposition (A. M. Marti et al., Langmuir (2013), 29(19), 5927-5936), dip-coating H. Guo et al., Inorganic Chemistry Communications (2014), 41, 29-32), solvothermal preparation (S. R. Ahrenholtz et al., Journal of the American Chemical Society (2014), 136(6), 2464-2472), micro-wave induced thermal deposition (Y. Yeonahick et al. Chemical communications (Cambridge, England) (2008), (21), 2441-3) and electrodeposition (Y.-Min Zhu et al., Journal of Materials Chemistry A: Materials for Energy and Sustainability (2013), 1(37), 11312-11319).

In WO 2010/077030 A1 a process for coating a support surface with porous metal-organic framework materials is disclosed using spraying technology and solvents as processing aids.

US 2011/0260100 A1 describes a supported film of a metal-organic framework as electrode material with non-fibrillated polyvinylidene fluoride and carbon black as further film components. However the use of a solvent for the preparation of such film is limiting as not all metal-organic framework materials are stable enough for such process. Another drawback from using a solvent-based binder relates to the porosity of the MOF material whose pores may be closed or blocked by the dissolved binder.

All these methods have disadvantages such as complexity of technique and process equipment, limitations regarding upscaling (laboratory scale only), requirement of a substrate and/or solvent, limitation to very specific reaction parameters as for example temperature or limitations due to viscosity.

Thus, there is a need for novel MOF films, which can be prepared by methods at least partly avoiding the above disadvantages.

Accordingly, an object of the present invention is to provide such MOF films.

The object is achieved by a porous film comprising
(A) from 51 wt.-% to 99.9 wt.-% based on the total weight of the film of at least one porous metal-organic framework material, the material comprising at least one at least bidentate organic compound coordinated to at least one metal ion;
(B) from 0.1 wt.-% to 49 wt.-% based on the total weight of the film of at least one fibrillated fluoropolymer; and
(C) 0 wt.-% to 48.9 wt.-% based on the total weight of the film of an additive component.

Surprisingly, it has been found that a porous metal-organic framework material in such films can retain its porosity at least to a certain degree compared to the powder material resulting in the capability to prepare porous films of high density. This is particularly surprising as metal-organic frameworks are partially formed by weak non-covalent chemical bonds. Moreover, the preparation of freestanding films is possible and the fabrication process for the film of the present invention only requires a limited number of simple steps. The fabrication process is also easily scalable. The fabrication process can be fully dry.

In order to provide a MOF film component (B) is required as film "inducing" agent. Fibrillated fluoropolymers are known in the art. Starting from a fluoropolymer capable of processing-induced fibrillation the polymer, optionally as part of a mixture, is subject to sufficient shear force to Induce fibrillation.

It is clear to the practitioner in the art that the film can comprise one, two different or more different fluoropolymers. Accordingly the term "at least one fluoropolymer" refers to one or more, e.g. two, three or four, fluoropolymers. The weight percentages given for component (B) refer to all fluoropolymers in the film and thus can be calculated from the sum of fluoropolymers. However it is preferred that only one fluoropolymer is present in the film.

In a preferred embodiment the at least one fibrillated fluoropolymer is selected from the group of polymers and copolymers consisting of trifluoroethylene, hexafluoropropylene, monochiorotrifluoroethylene, dichlorodifluoroethylene, tetrafluoroethylene, perfluorobutyl ethylene, perfluoro (alkyl vinyl ether), vinylidene fluoride, and vinyl fluoride and blends thereof. Accordingly homopolymers of one of the above monomers or copolymers of two or more of these monomers can be used. More preferably, the at least one fluoropolymer is a fibrillated poly-tertrafluoroethylene (PTFE).

Such fibrillated PTFE is known In the art, e.g. from US 2003/0219587 A1, U.S. Pat. No. 4,379,772 A, US 2006/0185336 A1 and U.S. Pat. No. 4,153,661 A. Accordingly, it has been recognized that, when subjected to shear forces, small particles of certain polymeric materials, e. g., perfluorinated polymers such as PTFE, will form fibrils of microscopic size. Using this knowledge, Ree et al. described in the late 1970s in U.S. Pat. No. 4,153,661 A a PTFE composite sheet for use as an electronic insulator, a battery separator, and/or a semipermeable membrane for use in separation science. Formation of the tough, attractive, and extremely pliable film involved intensive mixing of the PTFE and lubricant mixture sufficient to cause the PTFE fibrils to fibrillate and form a sheet. Thus, the fibrils of polytetrafluoroethylene resin can be obtained by applying a shearing stress to particles of polytetrafluoroethylene resin (US 2006/0185336 A1).

The PTFE resin can have a number average molecular weight of 3,000,000 to 50,000,000 g/mol, preferably from 5,000,000 to 15,000,000 g/mol, as described in US 2006/0185336 A1. In US 2006/0185336 the resin was mixed with a functional agent such as an ion-exchange resin, activated carbon, zeolite, silica gel, metal oxide catalyst and the like, in order to be further processed to an air filter sheet.

Suitable PTFE grades are commercially available such as Teflon manufactured by E. I. du Pont de Nemours & Company; Fluon manufactured by ASAHI GLASS CO., LTD. of Japan and Dyneon manufactured by the 3M Company, St. Paul, Minn.

The film can be freestanding or supported. In case the film is supported any suitable support can be used. Such support can be porous, partly porous or non-porous. The support can be mono- or multi-layered. The support can be thermally and/or electrically conducting, semiconducting or insulating. A rigid or flexible support is possible. Examples for suitable supports include metals, like titanium, zirconium, hafnium, vanadium, niobium, tantalum, chromium, molybdenum, tungsten, manganese, rhenium, iron, ruthenium, osmium, cobalt, rhodium, Iridium, nickel, platinum, palladium, copper, silver, gold, zinc, aluminum, tin, lead, metals from the lanthanide series; metal alloys like steel; carbon substrates; meshes; fabrics; cellulose materials, like paper and wood; ceramics; semi-conductors, like silicon, germanium, gallium arsenide, indium phosphide, glass; quartz; metal oxides, like aluminum oxide, silicon oxide, zirconium oxide and indium tin oxide; silicon carbide; polymers and the like.

The film can be supplied to the support after its preparation by suitable deposition methods. Examples for such methods adhesion coating using an adhesive, which can also be part of the film as an additive component (C) or only using adhesion forces of the film when stamping, pressing, molding or embossing the film onto the support.

Preferably, the film has a thickness of at least 0.5 μm (more preferably 1 μm to 2 cm, even more preferably 1 μm to 1 cm, even more preferably 5 μm to 500 μm, even more preferably 10 μm to 100 μm) when the film is freestanding and at least 0.1 μm (more preferably 1 μm to 2 cm, even more preferably 1 μm to 1 cm, even more preferably 5 μm to 500 μm, even more preferably 10 μm to 100 μm) when the film is supported.

In case the film has different thicknesses the lower value of a range represents the minimum value of all thickness values and the upper value of a range represents the maximum value of all thicknesses.

Preferably, the film has a two-dimensional surface with at least one dimension which exceeds 1 cm. The length of the film can be adjusted as required for a specific application. In principle the length is not limited. Thus also coils of films are possible. In this case it is advantageous to separate each film layer from each other by separation means, like a release agent or separating foil.

The metal organic framework used as component (A) of the film according to the present invention as well as the film of the present invention comprise pores, in particular micropores and/or mesopores. Micropores are defined as pores having a diameter of 2 nm or less and mesopores are defined by a diameter in the range from 2 to 50 nm (Pure & Appl. Chem. 57 (1985) 603-619). The presence of micropores and/or mesopores can be checked by means of sorption measurements, with these measurements determining the uptake capacity of the metal organic frameworks for nitrogen at 77 Kelvin in accordance with DIN 66134:1998-02.

Preferably, the specific surface area of the film measured according to BET (DIN ISO 9277:2003-05) is at least 50 $m^2/g$, more preferably, at least 100 $m^2/g$, more preferably, at least 250 $m^2/g$, more preferably, at least 500 $m^2/g$, more preferably, at least 500 $m^2/g$, more preferably at least 600 $m^2/g$, even more preferably at least 700 $m^2/g$, in particular at least 800 $m^2/g$.

Preferably, the volumetric specific surface area of the film is at least 15 $m^2/cm^3$. The volumetric specific surface area can be calculated by determining the product of specific surface area $[m^2/g]$ of the film and the density $[g/cm^3]$ of the film.

Preferably, the film is preferably flexible. Accordingly, the film can be bended, twisted, rolled, folded or presented as flat film.

Preferably, the amounts based on the total weight of the film are 51 weight percent (wt.-%) to 99.9 wt.-% of (A), 0.1 wt.-% to 49 wt.-% of (B) and 0 wt.-% of (C). More preferably, the amounts based on the total weight of the film are 75 wt.-% to 99 wt.-% of (A), 1 wt.-% to 25 wt.-% of (B) and 0 wt.-% of (C). Even more preferably, the amounts based on the total weight of the film are 80 wt.-% to 98 wt.-% of (A), 2 wt.-% to 20 wt.-% of (B) and 0 wt.-% of (C). Even more preferably, the amounts based on the total weight of the film are 85 wt.-% to 98 wt.-% of (A), 2 wt.-% to 15 wt.-% of (B) and 0 wt.-% of (C).

Preferably, the amounts based on the total weight of the film are 51 wt.-% to 99.8 wt.-% of (A), 0.1 wt.-% to 48.9 wt.-% of (B) and 0.1 to 48.9 wt.-% of (C). More preferably, the amounts based on the total weight of the film are 51 wt.-% to 98 wt.-% of (A), 1 wt.-% to 15 wt.-% of (B) and 1 wt.-% to 34 wt.-% of (C). More preferably, the amounts based on the total weight of the film are 55 wt.-% to 95 wt.-% of (A), 2 wt.-% to 15 wt.-% of (B) and 3 wt.-% to 30 wt.-% of (C). More preferably, the amounts based on the total weight of the film are 61 wt.-% to 95 wt.-% of (A), 2 wt.-% to 12 wt.-% of (B) and 3 wt.-% to 27 wt.-% of (C).

Component (A) refers to at least one metal-organic framework material. Accordingly, the film of the present invention can comprise one metal-organic framework material. It is also possible that mixtures of different metal-organic framework materials are used. In this case the amounts given above represent the total amount of all metal-organic framework materials in the mixture. Such mixture can consist of two different metal-organic framework materials. It is also possible that more than two, like three, four or more different metal-organic framework materials represent the mixture.

Such metal-organic framework materials (MOF) are, for example, described in U.S. Pat. No. 5,648,508, EP-A-0 790 253, M. O'Keeffe et al., J. Sol. State Chem., 152 (2000), pages 3 to 20, H. U et al., Nature 402, (1999), page 276, M. Eddaoudi et al., Topics in Catalysis 9, (1999), pages 105 to 111, B. Chen et al., Science 291, (2001), pages 1021 to 1023, DE-A-101 11 230, DE-A 10 2005 053430, WO-A 2007/054581, WO-A 2005/049892 and WO-A 2007/023134.

As a specific group of these metal-organic frameworks, "limited" frameworks in which, as a result of specific selection of the organic compound, the framework does not extend infinitely but forms polyhedra are described in the literature. A. C. Sudik, et al., J. Am. Chem. Soc. 127 (2005), 7110-7118, describe such specific frameworks. Here, they will be described as metal-organic polyhedra (MOP) to distinguish them.

A further specific group of porous metal-organic frameworks comprises those in which the organic compound as ligand is a monocyclic, bicyclic or polycyclic ring system which is derived at least from one of the heterocycles selected from the group consisting of pyrrole, alpha-pyridone and gamma-pyridone and has at least two ring nitrogens. The electrochemical preparation of such frameworks is described in WO-A 2007/131955.

As already stated above, the metal-organic frameworks according to the present invention comprise pores, in particular micropores and/or mesopores. Micropores are defined as pores having a diameter of 2 nm or less and mesopores are defined by a diameter in the range from 2 to 50 nm, in each case corresponding to the definition given in Pure & Applied Chem. 57 (1983), 603-619, in particular on page 606. The presence of micropores and/or mesopores can be checked by means of sorption measurements which determine the absorption capacity of the MOF for nitrogen at 77 Kelvin in accordance with DIN 66134:1998-02.

The specific surface area, calculated according to the BET model (DIN ISO 9277:2003-05), of a MOF powder is preferably greater than 100 m$^2$/g, more preferably greater than 200 m$^2$/g, more preferably greater than 500 m$^2$/g. Depending on the MOF, it is also possible to achieve greater than 1000 m$^2$/g, more preferably greater than 1500 m$^2$/g and particularly preferably greater than 2000 m$^2$/g. Typically the specific surface area is less than 5000 m$^2$/g.

The metal component in the framework according to the present invention is preferably selected from groups Ia, IIa, IIa, IVa to VIIIa and Ib to VIb of the periodic table. Particular preference is given to Mg, Ca, Sr, Ba, Sc, Y, Ln, Ti, Zr, Hf, V, Nb, Ta, Cr, Mo, W, Mn, Re, Fe, Ro, Os, Co, Rh, Ir, Ni, Pd, Pt, Cu, Ag, Au, Zn, Cd, Hg, Al, Ga, In, Tl, Si, Ge, Sn, Pb, As, Sb and Bi, where Ln represents lanthanides.

Lanthanides are La, Ce, Pr, Nd, Pm, Sm, En, Gd, Tb, Dy, Ho, Er, Tm, Yb.

As regards the ions of these elements, particular mention may be made of $Mg^{2+}$, $Ca^{2+}$, $Sr^{2+}$, $Ba^{2+}$, $Sc^{3+}$, $Y^{3+}$, $Ln^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^{+}$, $Ir^{2+}$, $Ir^{+}$, $NP^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{3+}$, $Sb^{5+}$, $Sb^{3+}$, $Sb^{+}$, $Bi^{5+}$, $Bi^{3+}$ and $Bi^{+}$.

Very particular preference is given to Mg, Ca, Al, Y, Sc, Zr, Ti, V, Cr, Mo, Fe, Co, Cu, Ni, Zn, Ln. Greater preference is given to Mg, Zr, Ni, Al, Mo, Y, Sc, Mg, Fe, Cu and Zn. In particular, Mg, Fe, Zr, Sc, Al, Cu and Zn are preferred. Very particular mention may here be made of Mg, Zr, Al, Cu and Zn, in particular Al, Zn and Cu.

The term "at least bidentate organic compound" refers to an organic compound which comprises at least one functional group which is able to form at least two coordinate bonds to a given metal ion and/or to form one coordinate bond to each of two or more, preferably two, metal atoms.

As functional groups via which the abovementioned coordinate bonds are formed, particular mention may be made by way of example of the following functional groups: —CO$_2$H, —CS$_2$H, —NO$_2$, —B(OH)$_2$, —SO$_3$H, —Si(OH)$_3$, —Ge(OH)$_3$, —Sn(OH)$_3$, —Si(SH)$_4$, —Ge(SH)$_4$, —Sn(SH)$_3$, —PO$_3$H, —AsO$_3$H, —AsO$_4$H, —P(SH)$_3$, —As(SH)$_3$, —CH(RSH)$_2$, —C(RSH)$_3$ —CH(RNH$_2$)$_2$—C(RNH$_2$)$_3$, —CH(ROH)$_2$, —C(ROH)$_2$, —CH(RCN)$_2$, —C(RCN)$_3$, where R is, for example, preferably an alkylene group having 1, 2, 3, 4 or 5 carbon atoms, for example a methylene, ethylene, n-propylene, i-propylene, n-butylene, i-butylene, tert-butylene or n-pentylene group, or an aryl group comprising 1 or 2 aromatic rings, for example 2 C$_6$ rings, which may optionally be fused and may, independently of one another, be appropriately substituted by at least one substituent in each case and/or may, independently of one another, in each case comprise at least one heteroatom such as N, O and/or S. In likewise preferred embodiments, mention may be made of functional groups in which the abovementioned radical R is not present. In this respect, mention may be made of, inter alia, —CH(SH)$_2$, —C(SH)$_3$, —CH(NH$_2$)$_2$, —C(NH$_2$)$_3$, —CH(OH)$_2$, —C(OH)$_3$, —CH(CN)$_2$ or —C(CN)$_3$.

However, the functional groups can also be heteroatoms of a heterocycle. Particular mention may here be made of nitrogen atoms.

The at least two functional groups can in principle be bound to any suitable organic compound as long as it is ensured that the organic compound bearing these functional groups is capable of forming the coordinate bond and of producing the framework.

The organic compounds comprising the at least two functional groups are preferably derived from a saturated or unsaturated aliphatic compound or an aromatic compound or a both aliphatic and aromatic compound.

The aliphatic compound or the aliphatic part of the both aliphatic and aromatic compound can be linear and/or branched and/or cyclic, with a plurality of rings per compound also being possible. The aliphatic compound or the aliphatic part of the both aliphatic and aromatic compound more preferably comprises from 1 to 15, more preferably from 1 to 14, more preferably from 1 to 13, more preferably from 1 to 12, more preferably from 1 to 11 and particularly preferably from 1 to 10, carbon atoms, for example 1, 2, 3, 4, 5, 6, 7, 8, 9 or 10 carbon atoms. Particular preference is given here to, inter alia, methane, adamantane, acetylene, ethylene or butadiene.

The aromatic compound or the aromatic part of the both aromatic and aliphatic compound can have one or more rings, for example two, three, four or five rings, with the rings being able to be present separately from one another and/or at least two rings being able to be present in fused form. The aromatic compound or the aromatic part of the both aliphatic and aromatic compound particularly preferably has one, two or three rings, with one or two rings being particularly preferred. Furthermore, each ring of said compound can independently comprise at least one heteroatom, for example N, O, S, B, P, Si, Al, preferably N, O and/or S. The aromatic compound or the aromatic part of the both aromatic and aliphatic compound more preferably comprises one or two C$_6$ rings, with the two being present either separately from one another or in fused form. In particular, mention may be made of benzene, naphthalene and/or biphenyl and/or bipyridyl and/or pyridyl as aromatic compounds.

The at least bidentate organic compound is more preferably an aliphatic or aromatic, acyclic or cyclic hydrocarbon which has from 1 to 18, preferably from 1 to 10 and in particular 6, carbon atoms and additionally has exclusively 2, 3 or 4 carboxyl groups as functional groups.

The at least one at least bidentate organic compound is preferably derived from a dicarboxylic, tricarboxylic or tetracarboxylic acid.

For example, the at least bidentate organic compound is derived from a dicarboxylic acid such as oxalic acid, succinic acid, tartaric acid, 1,4-butanedicarboxylic acid, 1,4- butenedicarboxylic acid, 4-oxopyran-2,6-dicarboxylic acid, 1,6-hexanedicarboxylic acid, decanedicarboxylic acid, 1,8-heptadecanedicarboxylic acid, 1,9-heptadecanedicarboxlic acid, heptadecanedicarboxylic acid, acetylenedicarboxylic acid, 1,2-benzenedicarboxylic acid, 1,3-benzenedicarboxylic acid, 2,3-pyridinedicarboxylic acid, pyridine-2,3-dicarboxylic acid, 1,3-butadiene-1,4-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diaminophenylmethane-3,3'-dicarboxylic acid, quinoline-3,4-dicarboxylic acid, 7-chloro-4-hydroxyquinoline-2,8-dicarboxylic acid, diimidedicarboxylic acid, pyridine-2,6-dicarboxylic acid, 2-methylimidazole-4,5-dicarboxylic acid, thiophene-3,4-dicarboxylic acid, 2-isopropylimidazole-4,5-dicarboxylic acid, tetrahydropyran-4,4-dicarboxylic acid, perylene-3,9-dicarboxylic acid, perylenedicarboxylic acid, Pluriol E 200-dicarboxylic acid, 3,6-dioxaoctanedicarboxylic acid, 3,5-cyclohexadiene-1,2-dicarboxylic acid, octanedicarboxylic acid, pentane-3,3-dicarboxylic acid, 4,4'-diamino-1,1'-biphenyl-3,3'-dicarboxylic acid, 4,4'-diaminobiphenyl-3,3'-dicarboxylic acid, benzidine-3,3'-dicarboxylic acid, 1,4-bis(phenylamino)benzene-2,5-dicarboxylic acid, 1,1'-binaphthyldicarboxylic acid, 7-chloro-8-methylquinoline-2,3-dicarboxylic acid, 1-anilinoanthraquinone-2,4'-dicarboxylic acid, polytetrahydrofuran 250-dicarboxylic acid, 1,4-bis(carboxymethyl)piperazine-2,3-dicarboxylic acid, 7-chloroquinoline-3,8-dicarboxylic acid, 1-(4-carboxy)phenyl-3-(4-chloro) phenylpyrazoline-4,5-dicarboxylic acid, 1,4,5,6,7,7-hexachloro-5-norbornene-2,3-dicarboxylic acid, phenylindanedicarboxylic acid, 1,3-dibenzyl-2-oxoimidazolidine-4,5-dicarboxylic acid, 1,4-cyclohexanedicarboxylic acid, naphthalene-1,8-dicarboxylic acid, 2-benzoylbenzene-1,3-dicarboxylic acid, 1,3-dibenzyl-2-oxoimidazolidene-4,5-cis-dicarboxylic acid, 2,2'-biquinoline-4,4'-dicarboxylic acid, pyridine-3,4-dicarboxylic acid, 3,6,9-trioxaundecanedicarboxylic acid, hydroxybenzophenonedicarboxylic acid, Pluriol E 300-dicarboxylic acid, Plurol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazinedicarboxylic acid, 4,4'-diamino(diphenyl ether)diimidedicarboxylic acid, 4,4'-diaminodiphenylmethanediimidedicarboxylic acid, 4,4'-diamino(diphenyl sulfone) diimidedicarboxylic acid, 1,4-naphthalenedicarboxylic acid, 2,6-naphthalenedicarboxylic acid, 1,3-adamantanedicarboxylic acid, 1,8-naphthalenedicarboxylic acid, 2,3-naphthalenedicarboxylic acid, 8-methoxy-2,3-naphthalenedicarboxylic acid, 8-nitro-2,3-naphthalenedicarboxylic acid, 8-sulfo-2,3-naphthalenedicarboxylic acid, anthracene-2,3-dicarboxylic acid, 2',3'-diphenyl-p-terphenyl-4,4"-dicarboxylic acid, (diphenyl ether)-4,4'-dicarboxylic acid, imidazole-4,5-dicarboxylic acid, 4(1H)-oxothiochromene-2,8-dicarboxylic acid, 5-tert-butyl-1,3-benzenedicarboxylic acid, 7,8-quinolinedicarboxylic acid, 4,5-imidazoledicarboxylic acid, 4-cyclohexene-1,2-dicarboxylic acid, hexatriacontanedicarboxylic acid, tetradecanedicarboxylic acid, 1,7-heptanedicarboxylic acid, 5-hydroxy-1,3-benzenedicarboxylc acid, 2,5-dihydroxy-1,4-dicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxydiphenylmethane-3,3'-dicarboxylic acid, 1-amino-4-methyl-9,10-dioxo-9,10-dihydroanthracene-2,3-dicarboxylic acid, 2,5-pyridinedicarboxylic acid, cyclohexene-2,3-dicarboxylic acid, 2,9-dichlorofluorubin-4,11-dicarboxylic acid, 7-chloro-3-methylquinoline-6,8-dicarboxylic acid, 2,4-dichlorbenzophenone-2',5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid 1,14-tetradecanedicarboxylic acid, 5,6-dehydronorbornane-2,3-dicarboxylic acid, 5-ethyl-2,3-pyridinedicarboxylic acid or camphordicarboxylic acid, Furthermore, the at least bidentate organic compound is more preferably one of the dicarboxylic acids mentioned by way of example above as such.

The at least bidentate organic compound can, for example, be derived from a tricarboxylic acid such as 2-hydroxy-1,2,3-propanetricarboxylic acid, 7-chloro-2,3,8-quinolinetricarboxylic acid, 1,2,3-, 1,2,4-benzenetricarboxylic acid, 1,2,4-butanetricarboxylic acid, 2-phosphono-1,2,4-butanetricarboxylic acid, 1,3,5-benzenetricarboxylic acid, 1-hydroxy-1,2,3-propanetricarboxylic acid, 4,5-dihydro-4,5-dioxo-1H-pyrrolo[2,3-F]quinoline-2,7,9-tricarboxylic acid, 5-acetyl-3-amino-6-methylbenzene-1,2,4-tricarboxylic acid, 3-amino-5-benzoyl-6-methylbenzene-1,2,4-tricarboxylic acid, 1,2,3-propanetricarboxylic acid or aurintricarboxylic acid.

Furthermore, the at least bidentate organic compound is more preferably one of the tricarboxylic acids mentioned by way of example above as such.

Examples of an at least bidentate organic compound derived from a tetracarboxylic acid are 1,1-dioxidoperylo[1,12-BCD]thiophene-3,4,9,10-tetracarboxylic acid, perylenetetracarboxylic acids such as perylene-3,4,9,10-tetracarboxylic acid or (perylene-1,12-sulfone)-3,4,9,10-tetracarboxylic acid, butanetetracarboxylic acids such as 1,2,3,4-butanetetracarboxylic acid or meso-1,2,3,4-butanetetracarboxylic acid, decane-2,4,6,8-tetracarboxylic acid, 1,4,7,10,13,16-hexaoxacyclooctadecane-2,3,11,12-tetracarboxylic acid, 1,2,4,5-benzenetetracarboxylic acid, 1,2,11,12-dodecanetetracarboxylic acid, 1,2,5,6-hexanetetracarboxylic acid, 1,2,7,8-octanetetracarboxylic acid, 1,4,5,8-naphthalenetetracarboxylic acid, 1,2,9,10-decanetetracarboxylic acid, benzophenonetetracarboxylic acid, 3,3',4,4'-benzophenonetetracarboxylic acid, tetrahydrofurantetracarboxylic acid or cyclopentanetetracarboxylic acids such as cyclopentane-1,2,3,4-tetracarboxylic acid.

Furthermore, the at least bidentate organic compound is more preferably one of the tetracarboxylic acids mentioned by way of example above as such.

Preferred heterocycles as at least bidentate organic compound in which a coordinate bond is formed via the ring heteroatoms are the following substituted or unsubstituted ring systems:

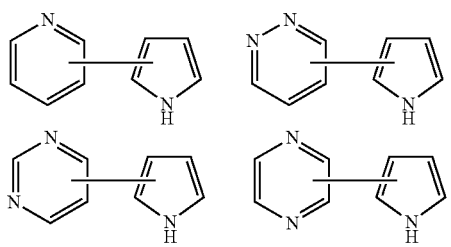

-continued

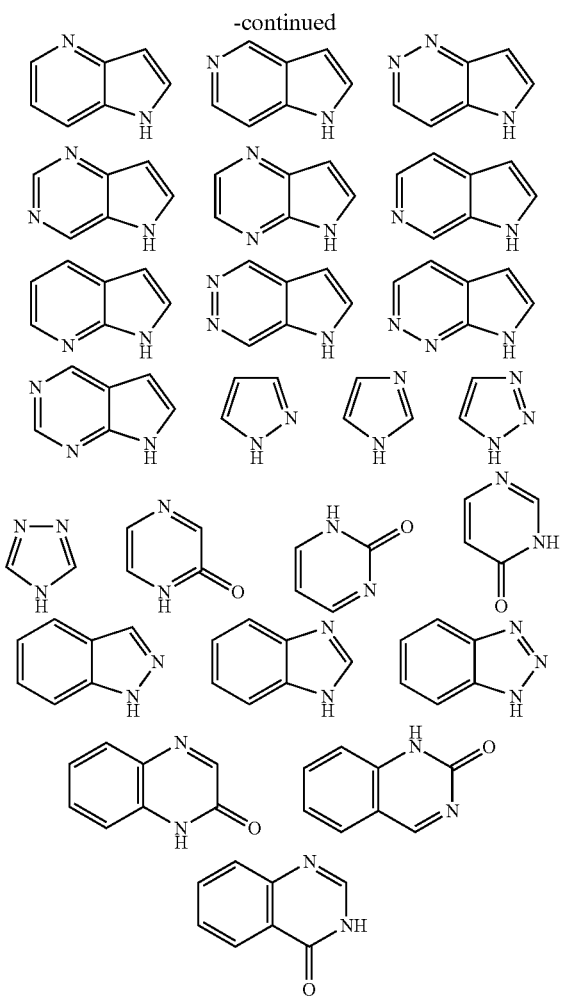

Very particular preference is given to using optionally at least monosubstituted aromatic dicarboxylic, tricarboxylic or tetracarboxylic acids which can have one, two, three, four or more rings, with each of the rings being able to comprises at least one heteroatom and two or more rings being able to comprise identical or different heteroatoms. For example preference is given to one-ring dicarboxylic acids, one-ring tricarboxylic acids, one-ring tetracarboxylic acids, two-ring dicarboxylic acids, two-ring tricarboxylic acids, two-ring tetracarboxylic acids, three-ring dicarboxylic acids, three-ring tricarboxylic acids, three-ring tetracarboxylic acids, four-ring dicarboxylic acids, four-ring tricarboxylic acids and/or four-ring tetracarboxylic acids. Suitable heteroatoms are, for example, N, O, S, B, P, and preferred heteroatoms are N, S and/or O. Suitable substituents here are, inter alia, —OH, a nitro group, an amino group or an alkyl or alkoxy group.

Particularly preferred at least bidentate organic compounds are imidazolates such as 2-methylimidazolate, acetylenedicarboxylic acid (ADC), camphordicarboxylic acid, fumaric acid, succinic acid, benzenedicarboxylic acids such as phthalic acid, isophthalic acid, terephthalic acid (BDC), aminoterephthalic acid, triethylenediamine (TEDA), methylglycinediacetic acid (MGDA), naphthalenedicarboxylc acids (NDC), biphenyldicarboxylic acids such as 4,4'-biphenyidicarboxylic acid (BPDC), pyrazinedicarboxylic acids such as 2,5-pyrazinedicarboxylic acid, bipyridinedicarboxylic acids such as 2,2-bipyridinedicarboxylic acids such as 2,2'-bipyridine-5,5'-dicarboxylic acid, benzenetricarboxylic acids such as 1,2,3-, 1,2,4-benzenetricarboxylic acid or 1,3,5-benzenetricarboxylic acid (BTC), benzenetetracarboxylic acid, adamantanetetracarboxylic acid (ATC), adamantanedibenzoate (ADB), benzenetribenzoate (BTB), methanetetrabenzoate (MTB), adamantanetetrabenzoate or dlhydroxyterephthalic acids such as 2,5-dihydroxyterephthalic acid (DHBDC), tetrahydropyrene-2,7-dicarboxylic acid (HPDC), biphenyltetracarboxylic acid (BPTC), 1,3-bis(4-pyridyl)propane (BPP).

Very particular preference is given to using, inter alia, 2-methylimidazole, 2-ethylimidazole, phthalic acid, isophthalic acid, terephthalic acid, 2,6-naphthalenedicarboxylic acid, 1,4-naphthalenedicarboxylic acid, 1,5-naphthalenedicarboxylic acid, 1,2,3-benzenetricarboxylic acid, 1,2,4-benzenetricarboxylic acid, 1,3,5-benzenetricarboxylic acid, 1,2,4,5-benzenetetracarboxylic acid, aminoBDC, TEDA, fumaric acid, biphenyldicarboxylate, 1,5- and 2,6-naphthalenedicarboxylic acid, tert-butylisophthalic acid, dihydroxybenzoic acid, BTB, HPDC, BPTC, BPP, fumaric acid.

Particularly preferred are 1,3,5-BTC, fumaric acid, 2-methylimidazole.

Apart from these at least bidentate organic compounds, the metal-organic framework can also comprise one or more monodentate ligands and/or one or more at least bidentate ligands which are not derived from a dicarboxylic, tricarboxlic or tetracarboxylic acid.

Apart from these at least bidentate organic compounds, the metal-organic framework can also comprise one or more monodentate ligands.

Preferred at least bidentate organic compounds are formic acid, acetic acid or an aliphatic dicarboxylic or polycarboxylic acid, for example malonic acid, fumaric acid or the like, in particular fumaric acid, or are derived from these.

For the purposes of the present invention, the term "derived" means that the at least one at least bidentate organic compound is present In partially or fully deprotonated form. Furthermore, the term "derived" means that the at least one at least bidentate organic compound can have further substituents. Thus, a dicarboxylic or polycarboxylic acid can have not only the carboxylic acid function but also one or more Independent substituents such as amino, hydroxyl, methoxy, halogen or methyl groups. Preference is given to no further substituent being present. For the purposes of the present invention, the term "derived" also means that the carboxylic acid function can be present as a sulfur analogue. Sulfur analogues are —C(=O)SH and its tautomer and —C(S)SH.

Suitable solvents for preparing the metal-organic framework are, inter alia, ethanol, dimethylformamide, toluene, methanol, chlorobenzene, diethylformamide, dimethyl sulfoxide, water, hydrogen peroxide, methylamine, sodium hydroxide solution, N-methylpyrrolidone ether, acetonitrile, benzyl chloride, triethylamine, ethylene glycol and mixtures thereof. Further metal ions, at least bidentate organic compounds and solvents for the preparation of MOFs are described, inter alia, in U.S. Pat. No. 5,648,508 or DE-A 101 11 230.

The pore size of the metal-organic framework can be controlled by selection of the appropriate ligand and/or the at least bidentate organic compound. In general, the larger the organic compound, the larger the pore size. The pore size is preferably from 0.2 nm to 30 nm, particularly preferably in the range from 0.3 nm to 3 nm, based on the crystalline material.

Examples of metal-organic frameworks are given below. In addition to the designation of the framework, the metal and the at least bidentate ligand, the solvent and the cell parameters (angles α, β and γ and the dimensions A, B and C in Å) are also indicated. The latter were determined by X-ray diffraction.

| MOF-n | Constituents molar ratio M + L | Solvents | α | β | γ | a | b | c | Space group |
|---|---|---|---|---|---|---|---|---|---|
| MOF-0 | Zn(NO$_3$)$_2$•6H$_2$O H$_3$(BTC) | ethanol | 90 | 90 | 120 | 16.711 | 16.711 | 14.189 | P6(3)/Mcm |
| MOF-2 | Zn(NO$_3$)$_2$•6H$_2$O (0.246 mmol) H$_2$(BDC) 0.241 mmol | DMF toluene | 90 | 102.8 | 90 | 6.718 | 15.49 | 12.43 | P2(1)/n |
| MOF-3 | Zn(NO$_3$)$_2$•6H$_2$O (1.89 mmol) H$_2$(BDC) (1.93 mmol) | DMF MeOH | 99.72 | 111.11 | 108.4 | 9.726 | 9.911 | 10.45 | P-1 |
| MOF-4 | Zn(NO$_3$)$_2$•6H$_2$O (1.00 mmol) H$_3$(BTC) (0.5 mmol) | ethanol | 90 | 90 | 90 | 14.728 | 14.728 | 14.728 | P2(1)3 |
| MOF-5 | Zn(NO$_3$)$_2$•6H$_2$O (2.22 mmol) H$_2$(BDC) (2.17 mmol) | DMF chloro-benzene | 90 | 90 | 90 | 25.669 | 25.669 | 25.669 | Fm-3m |
| MOF-38 | Zn(NO$_3$)$_2$•6H$_2$O (0.27 mmol) H$_3$(BTC) (0.15 mmol) | DMF chloro-benzene | 90 | 90 | 90 | 20.657 | 20.657 | 17.84 | I4cm |
| MOF-31 Zn(ADC)$_2$ | Zn(NO$_3$)$_2$•6H$_2$O 0.4 mmol H$_2$ADC 0.8 mmol | ethanol | 90 | 90 | 90 | 10.821 | 10.821 | 10.821 | Pn(-3)m |
| MOF-12 Zn$_2$(ATC) | Zn(NO$_3$)$_2$•6H$_2$O 0.3 mmol H$_4$(ATC) 0.15 mmol | ethanol | 90 | 90 | 90 | 15.745 | 16.907 | 18.167 | Pbca |
| MOF-20 ZnNDC | Zn(NO$_3$)$_2$•6H$_2$O 0.37 mmol H$_2$NDC 0.36 mmol | DMF chloro-benzene | 90 | 92.13 | 90 | 8.13 | 16.444 | 12.807 | P2(1)/c |
| MOF-37 | Zn(NO$_3$)$_2$•6H$_2$O 0.2 mmol H$_2$NDC 0.2 mmol | DEF chloro-benzene | 72.38 | 83.16 | 84.33 | 9.952 | 11.576 | 15.556 | P-1 |
| MOF-8 Tb$_2$(ADC) | Tb(NO$_3$)$_3$•5H$_2$O 0.10 mmol H$_2$ADC 0.20 mmol | DMSO MeOH | 90 | 115.7 | 90 | 19.83 | 9.822 | 19.183 | C2/c |
| MOF-9 Tb$_2$(ADC) | Tb(NO$_3$)$_3$•5H$_2$O 0.08 mmol H$_2$ADB 0.12 mmol | DMSO | 90 | 102.09 | 90 | 27.056 | 16.795 | 28.139 | C2/c |
| MOF-6 | Tb(NO$_3$)$_3$•5H$_2$O 0.30 mmol H$_2$(BDC) 0.30 mmol | DMF MeOH | 90 | 91.28 | 90 | 17.599 | 19.996 | 10.545 | P21/c |
| MOF-7 | Tb(NO$_3$)$_3$•5H$_2$O 0.15 mmol H$_2$(BDC) 0.15 mmol | H$_2$O | 102.3 | 91.12 | 101.5 | 6.142 | 10.069 | 10.096 | P-1 |
| MOF-69A | Zn(NO$_3$)$_2$•6H$_2$O 0.083 mmol 4,4'BPDC 0.041 mmol | DEF H$_2$O$_2$ MeNH$_2$ | 90 | 111.6 | 90 | 23.12 | 20.92 | 12 | C2/c |
| MOF-69B | Zn(NO$_3$)$_2$•6H$_2$O 0.083 mmol 2,6-NCD 0.041 mmol | DEF H$_2$O$_2$ MeNH$_2$ | 90 | 95.3 | 90 | 20.17 | 18.55 | 12.16 | C2/c |
| MOF-11 CU$_2$(ATC) | Cu(NO$_3$)$_2$•2.5H$_2$O 0.47 mmol H$_2$ATC 0.22 mmol | H$_2$O | 90 | 93.86 | 90 | 12.987 | 11.22 | 11.336 | C2/c |
| MOF-11 Cu$_2$(ATC) dehydr. | | | 90 | 90 | 90 | 8.4671 | 8.4671 | 14.44 | P42/mmc |
| MOF-14 Cu$_3$(BTB) | Cu(NO$_3$)$_2$•2.5H$_2$O 0.28 mmol H$_3$BTB 0.052 mmol | H$_2$O DMF EtOH | 90 | 90 | 90 | 26.946 | 26.946 | 26.946 | Im-3 |
| MOF-32 Cd(ATC) | Cd(NO$_3$)$_2$•4H$_2$O 0.24 mmol H$_4$ATC 0.10 mmol | H$_2$O NaOH | 90 | 90 | 90 | 13.468 | 13.468 | 13.468 | P(-4)3m |
| MOF-33 Zn$_2$(ATB) | ZnCl$_2$ 0.15 mmol H$_4$ATB 0.02 mmol | H$_2$O DMF EtOH | 90 | 90 | 90 | 19.561 | 15.255 | 23.404 | Imma |
| MOF-34 Ni(ATC) | Ni(NO$_3$)$_2$•6H$_2$O 0.24 mmol H$_4$ATC 0.10 mmol | H$_2$O NaOH | 90 | 90 | 90 | 10.066 | 11.163 | 19.201 | P2$_1$2$_1$2$_1$ |
| MOF-36 Zn$_2$(MTB) | Zn(NO$_3$)$_2$•4H$_2$O 0.20 mmol H$_4$MTB 0.04 mmol | H$_2$O DMF | 90 | 90 | 90 | 15.745 | 16.907 | 18.167 | Pbca |
| MOF-39 Zn$_3$O(HBTB) | Zn(NO$_3$)$_2$•4H$_2$O 0.27 mmol H$_3$BTB 0.07 mmol | H$_2$O DMF EtOH | 90 | 90 | 90 | 17.158 | 21.591 | 25.308 | Pnma |
| NO305 | FeCl$_2$•4H$_2$O 5.03 mmol formic acid 86.90 mmol | DMF | 90 | 90 | 120 | 8.2692 | 8.2692 | 63.566 | R-3c |
| NO306A | FeCl$_2$•4H$_2$O 5.03 mmol formic acid 86.90 mmol | DEF | 90 | 90 | 90 | 9.9364 | 18.374 | 18.374 | Pbcn |
| NO29 | Mn(Ac)$_2$•4H$_2$O 0.46 mmol H$_3$BTC 0.69 mmol | DMF | 120 | 90 | 90 | 14.16 | 33.521 | 33.521 | P-1 |
| MOF-0-similar BPR48 A2 | Zn(NO$_3$)$_2$•6H$_2$O 0.012 mmol H$_2$BDC 0.012 mmol | DMSO toluene | 90 | 90 | 90 | 14.5 | 17.04 | 18.02 | Pbca |
| BPR69 B1 | Cd(NO$_3$)$_2$ 4H$_2$O 0.0212 mmol H$_2$BDC 0.0428 mmol | DMSO | 90 | 98.76 | 90 | 14.16 | 15.72 | 17.66 | Cc |
| BPR92 A2 | Co(NO$_3$)$_2$•6H$_2$O 0.018 mmol H$_2$BDC 0.018 mmol | NMP | 106.3 | 107.63 | 107.2 | 7.5308 | 10.942 | 11.025 | P1 |
| BPR95 C5 | Cd(NO$_3$)$_2$ 4H$_2$O 0.012 mmol H$_2$BDC 0.36 mmol | NMP | 90 | 112.8 | 90 | 14.460 | 11.085 | 15.829 | P2(1)/n |
| Cu C$_6$H$_4$O$_6$ | Cu(NO$_3$)$_2$•2.5H$_2$O 0.370 mmol H$_2$BDC(OH)$_2$ 0.37 mmol | DMF chloro-benzene | 90 | 105.29 | 90 | 15.259 | 14.816 | 14.13 | P2(1)/c |
| M(BTC) MOF-0-similar | Co(SO$_4$) H$_2$O 0.055 mmol H$_3$BTC 0.037 mmol | DMF | | like MOF-0 | | | | | |
| Tb(C$_6$H$_4$O$_6$) | Tb(NO$_3$)$_3$•5H$_2$O 0.370 mmol H$_2$(C$_6$H$_4$O$_6$) 0.56 mmol | DMF chloro-benzene | 104.6 | 107.9 | 97.147 | 10.491 | 10.981 | 12.541 | P-1 |
| Zn (C$_2$O$_4$) | ZnCl$_2$ 0.370 mmol oxalic acid 0.37 mmol | DMF chloro-benzene | 90 | 120 | 90 | 9.4168 | 9.4168 | 8.464 | P(-3)1m |
| Co(CHO) | Co(NO$_3$)$_2$•5H$_2$O 0.043 mmol formic acid 1.60 mmol | DMF | 90 | 91.32 | 90 | 11.328 | 10.049 | 14.854 | P2(1)/n |
| Cd(CHO) | Cd(NO$_3$)$_2$•4H$_2$O 0.185 mmol formic acid 0.185 mmol | DMF | 90 | 120 | 90 | 8.5168 | 8.5168 | 22.674 | R-3c |
| Cu(C$_3$H$_2$O$_4$) | Cu(NO$_3$)$_2$•2.5H$_2$O 0.043 mmol malonic acid 0.192 mmol | DMF | 90 | 90 | 90 | 8.366 | 8.366 | 11.919 | P43 |

-continued

| MOF-n | Constituents molar ratio M + L | Solvents | α | β | γ | a | b | c | Space group |
|---|---|---|---|---|---|---|---|---|---|
| Zn$_6$ (NDC)$_5$ MOF-48 | Zn(NO$_3$)$_2$•6H$_2$O 0.097 mmol 14 NDC 0.069 mmol | DMF chlorobenzene H$_2$O$_2$ | 90 | 95.902 | 30 | 19.504 | 16.482 | 14.64 | C2/m |
| MOF-47 | Zn(NO$_3$)$_2$ 6H$_2$O 0.185 mmol H$_2$(BDC[CH$_3$]$_4$) 0.185 mmol | DMF chlorobenzene H$_2$O$_2$ | 90 | 92.55 | 90 | 11.303 | 16.029 | 17.535 | P2(1)/c |
| MO25 | Cu(NO$_3$)$_2$•2.5H$_2$O 0.084 mmol BPhDC 0.085 mmol | DMF | 90 | 112.0 | 90 | 23.880 | 16.834 | 18.389 | P2(1)/c |
| Cu-Thio | Cu(NO$_3$)$_2$•2.5H$_2$O 0.084 mmol thiophene dicarboxylic acid 0.085 mmol | DEF | 90 | 113.6 | 90 | 15.4747 | 14.514 | 14.032 | P2(1)/c |
| ClBDC1 | Cu(NO$_3$)$_2$•2.5H$_2$O 0.084 mmol H$_2$(BDCCl$_2$) 0.085 mmol | DMF | 90 | 105.6 | 90 | 14.911 | 15.622 | 18.413 | C2/c |
| MOF-101 | Cu(NO$_3$)$_2$•2.5H$_2$O 0.084 mmol BrBDC 0.085 mmol | DMF | 90 | 90 | 90 | 21.607 | 20.607 | 20.073 | Fm3m |
| Zn$_3$(BTC)$_2$ | ZnCl$_2$ 0.033 mmol H$_3$BTC 0.033 mmol | DMF EtOH Base added | 90 | 90 | 90 | 26.572 | 26.572 | 26.572 | Fm-3m |
| MOF-j | Co(CH$_3$CO$_2$)$_2$•4H$_2$O (1.65 mmol) H$_3$(BZC) (0.95 mmol) | H$_2$O | 90 | 112.0 | 90 | 17.482 | 12.963 | 6.559 | C2 |
| MOF-n | Zn(NO$_3$)$_2$•6H$_2$O H$_3$ (BTC) | ethanol | 90 | 90 | 120 | 16.711 | 16.711 | 14.189 | P6(3)/mcm |
| PbBDC | Pb(NO$_3$)$_2$ (0.181 mmol) H$_2$(BDC) (0.181 mmol) | DMF ethanol | 90 | 102.7 | 90 | 8.3639 | 17.991 | 9.9617 | P2(1)/n |
| Znhex | Zn(NO$_3$)$_2$•6H$_2$O (0.171 mmol) H$_3$BTB (0.114 mmol) | DMF p-xylene ethanol | 90 | 90 | 120 | 37.1165 | 37.117 | 30.019 | P3(1)c |
| AS16 | FeBr$_2$ 0.927 mmol H$_2$(BDC) 0.927 mmol | DMF anhydr. | 90 | 90.13 | 90 | 7.2595 | 8.7894 | 19.484 | P2(1)c |
| AS27-2 | FeBr$_2$ 0.927 mmol H$_3$(BDC) 0.464 mmol | DMF anhydr. | 90 | 90 | 90 | 26.735 | 26.735 | 26.735 | Fm3m |
| AS32 | FeCl$_3$ 1.23 mmol H$_2$(BDC) 1.23 mmol | DMF anhydr. ethanol | 90 | 90 | 120 | 12.535 | 12.535 | 18.479 | P6(2)c |
| MOF-47 | Zn(NO$_3$)$_2$ 6H$_2$O 0.185 mmol H$_2$(BDC[CH$_3$]$_4$) 0.185 mmol | DMF chlorobenzene H$_2$O$_2$ | 90 | 92.55 | 90 | 11.303 | 16.029 | 17.535 | P2(1)/c |
| MO25 | Cu(NO$_3$)$_2$•2.5H$_2$O 0.084 mmol BPhDC 0.085 mmol | DMF | 90 | 112.0 | 90 | 23.880 | 16.834 | 18.389 | P2(1)/c |
| Cu-Thio | Cu(NO$_3$)$_2$•2.5H$_2$O 0.084 mmol thiophene dicarboxylic acid 0.085 mmol | DEF | 90 | 113.6 | 90 | 15.4747 | 14.514 | 14.032 | P2(1)/c |
| ClBDC1 | Cu(NO$_3$)$_2$•2.5H$_2$O 0.084 mmol H$_2$(BDCCl$_2$) 0.085 mmol | DMF | 90 | 105.6 | 90 | 14.911 | 15.622 | 18.413 | C2/c |
| MOF-101 | Cu(NO$_3$)$_2$•2.5H$_2$O 0.084 mmol BrBDC 0.085 mmol | DMF | 90 | 90 | 90 | 21.607 | 20.607 | 20.073 | Fm3m |
| Zn$_3$(BTC)$_2$ | ZnCl$_2$ 0.033 mmol H$_3$BTC 0.033 mmol | DMF EtOH Base added | 90 | 90 | 90 | 26.572 | 26.572 | 26.572 | Fm-3m |
| MOF-j | Co(CH$_3$CO$_2$)$_2$•4H$_2$O (1.65 mmol) H$_3$(BZC) (0.95 mmol) | H$_2$O | 90 | 112.0 | 90 | 17.482 | 12.963 | 6.559 | C2 |
| MOF-n | Zn(NO$_3$)$_2$•6H$_2$O H$_3$ (BTC) | ethanol | 90 | 90 | 120 | 16.711 | 16.711 | 14.189 | P6(3)/mcm |
| PbBDC | Pb(NO$_3$)$_2$ (0.181 mmol) H$_2$(BDC) (0.181 mmol) | DMF ethanol | 90 | 102.7 | 90 | 8.3639 | 17.991 | 9.9617 | P2(1)/n |
| Znhex | Zn(NO$_3$)$_2$•6H$_2$O (0.171 mmol) H$_3$BTB (0.114 mmol) | DMF p-xylene ethanol | 90 | 90 | 120 | 37.1165 | 37.117 | 30.019 | P3(1)c |
| AS16 | FeBr$_2$ 0.927 mmol H$_2$(BDC) 0.927 mmol | DMF anhydr. | 90 | 90.13 | 90 | 7.2595 | 8.7894 | 19.484 | P2(1)c |
| AS27-2 | FeBr$_2$ 0.927 mmol H$_3$(BDC) 0.464 mmol | DMF anhydr. | 90 | 90 | 90 | 26.735 | 26.735 | 26.735 | Fm3m |
| AS32 | FeCl$_3$ 1.23 mmol H$_2$(BDC) 1.23 mmol | DMF anhydr. ethanol | 90 | 90 | 120 | 12.535 | 12.535 | 18.479 | P6(2)c |
| AS54-3 | FeBr$_2$ 0.927 BPDC 0.927 mmol | DMF anhydr. n-propanol | 90 | 109.98 | 90 | 12.019 | 15.286 | 14.399 | C2 |
| AS61-4 | FeBr$_2$ 0.927 mmol m-BDC 0.927 mmol | anhydrous pyridine | 90 | 90 | 120 | 13.017 | 13.017 | 14.896 | P6(2)c |
| AS68-7 | FeBr$_2$ 0.927 mmol m-BDC 1.204 mmol | DMF anhydr. pyridine | 90 | 90 | 90 | 18.3407 | 10.036 | 18.039 | Pca2$_1$ |
| Zn(ADC) | Zn(NO$_3$)$_2$•6H$_2$O 0.37 mmol H$_2$(ADC) 0.36 mmol | DMF chlorobenzene | 90 | 99.85 | 90 | 16.764 | 9.349 | 9.635 | C2/c |
| MOF-12 Zn$_2$ (ATC) | Zn(NO$_3$)$_2$•6H$_2$O 0.30 mmol H$_4$(ATC) 0.15 mmol | ethanol | 90 | 90 | 90 | 15.745 | 16.907 | 18.167 | Pbca |
| MOF-20 ZnNDC | Zn(NO$_3$)$_2$•6H$_2$O 0.37 mmol H$_2$NDC 0.36 mmol | DMF chlorobenzene | 90 | 92.13 | 90 | 8.13 | 16.444 | 12.807 | P2(1)/c |
| MOF-37 | Zn(NO$_3$)$_2$•6H$_2$O 0.20 mmol H$_2$NDC 0.20 mmol | DEF chlorobenzene | 72.38 | 83.16 | 84.33 | 9.952 | 11.576 | 15.556 | P-1 |
| Zn(NDC) (DMSO) | Zn(NO$_3$)$_2$•6H$_2$O H$_2$NDC | DMSO | 68.08 | 75.33 | 88.31 | 8.631 | 10.207 | 13.114 | P-1 |
| Zn(NDC) | Zn(NO$_3$)$_2$•6H$_2$O H$_2$NDC | | 90 | 99.2 | 90 | 19.289 | 17.628 | 15.052 | C2/c |
| Zn(HPDC) | Zn(NO$_3$)$_2$•4H$_2$O 0.23 mmol H$_2$(HPDC) 0.05 mmol | DMF H$_2$O | 107.9 | 105.06 | 94.4 | 8.326 | 12.085 | 13.767 | P-1 |
| Co(HPDC) | Co(NO$_3$)$_2$•6H$_2$O 0.21 mmol H$_2$(HPDC) 0.06 mmol | DMF H$_2$O/ ethanol | 90 | 97.69 | 90 | 29.677 | 9.63 | 7.981 | C2/c |

-continued

| MOF-n | Constituents molar ratio M + L | Solvents | α | β | γ | a | b | c | Space group |
|---|---|---|---|---|---|---|---|---|---|
| Zn₃(PDC)2.5 | Zn(NO₃)₂•4H₂O 0.17 mmol H₂(HPDC) 0.05 mmol | DMF/ClBz H₂0/TEA | 79.34 | 80.8 | 85.83 | 8.564 | 14.046 | 26.428 | P-1 |
| Cd₂(TPDC)2 | Cd(NO₃)₂•4H₂O 0.06 mmol H₂(HPDC) 0.06 mmol | methanol/ CHP H₂O | 70.59 | 72.75 | 87.14 | 10.102 | 14.412 | 14.964 | P-1 |
| Tb(PDC)1.5 | Tb(NO₃)₃•5H₂O 0.21 mmol H₂(PDC) 0.034 mmol | DMF H₂O/ ethanol | 109.8 | 103.61 | 100.14 | 9.829 | 12.11 | 14.628 | P-1 |
| ZnDBP | Zn(NO₃)₂•6H₂O 0.05 mmol dibenzyl phosphate 0.10 mmol | MeOH | 90 | 93.67 | 90 | 9.254 | 10.762 | 27.93 | P2/n |
| Zn₃(BPDC) | ZnBr₂ 0.021 mmol 4,4'BPDC 0.005 mmol | DMF | 90 | 102.76 | 90 | 11.49 | 14.79 | 19.18 | P21/n |
| CdBDC | Cd(NO₃)₂•4H₂O 0.100 mmol H₂(BDC) 0.401 mmol | DMF Na₂SiO₃ (aq) | 90 | 95.85 | 90 | 11.2 | 11.11 | 16.71 | P21/n |
| Cd-mBDC | Cd(NO₃)₂•4H₂O 0.009 mmol H₂(mBDC) 0.018 mmol | DMF MeNH₂ | 90 | 101.1 | 90 | 13.69 | 18.25 | 14.91 | C2/c |
| Zn₄OBNDC | Zn(NO₃)₂•6H₂O 0.041 mmol BNDC | DEF MeNH₂ H₂OH₂ | 90 | 90 | 90 | 22.35 | 26.05 | 59.56 | Fmmm |
| Eu(TCA) | Eu(NO₃)₃•6H₂O 0.14 mmol TCA 0.026 mmol | DMF chloro- benzene | 90 | 90 | 90 | 23.325 | 23.325 | 23.325 | Pm-3n |
| Tb(TCA) | Tb(NO₃)₃•6H₂O 0.069 mmol TCA 0.026 mmol | DMF chloro- benzene | 90 | 90 | 90 | 23.272 | 23.272 | 23.372 | Pm-3n |
| Formate | Ce(NO₃)₃•6H₂O 0.138 mmol formic acid 0.43 mmol | H₂O ethanol | 90 | 90 | 120 | 10.668 | 10.667 | 4.107 | R-3m |
| | FeCl₂•4H₂O 5.03 mmol formic acid 86.90 mmol | DMF | 90 | 90 | 120 | 8.2692 | 8.2692 | 63.566 | R-3c |
| | FeCl₂•4H₂O 5.03 mmol formic acid 86.90 mmol | DEF | 90 | 90 | 90 | 9.9364 | 18.374 | 18.374 | Pbcn |
| | FeCl₂•4H₂O 5.03 mmol formic acid 86.90 mmol | DEF | 90 | 90 | 90 | 8.335 | 8.335 | 13.34 | P-31c |
| NO330 | FeCl₂•4H₂O 0.50 mmol formic acid 8.69 mmol | formamide | 90 | 90 | 90 | 8.7749 | 11.655 | 8.3297 | Pnna |
| NO332 | FeCl₂•4H₂O 0.50 mmol formic acid 8.69 mmol | DIP | 90 | 90 | 90 | 10.0313 | 18.808 | 18.355 | Pbcn |
| NO333 | FeCl₂•4H₂O 0.50 mmol formic acid 8.69 mmol | DBF | 90 | 90 | 90 | 45.2754 | 23.861 | 12.441 | Cmcm |
| NO335 | FeCl₂•4H₂O 0.50 mmol formic acid 8.69 mmol | CHF | 90 | 91.372 | 90 | 11.5964 | 10.187 | 14.945 | P21/n |
| NO336 | FeCl₂•4H₂O 0.50 mmol formic acid 8.69 mmol | MFA | 90 | 90 | 90 | 11.7945 | 48.843 | 8.4136 | Pbcm |
| NO13 | Mn(Ac)₂•4H₂O 0.46 mmol benzoic acid 0.92 mmol bipyridine 0.46 mmol | ethanol | 90 | 90 | 90 | 18.66 | 11.762 | 9.418 | Pbcn |
| NO29 MOF-0- similar | Mn(Ac)₂•4H₂O 0.46 mmol H₃BTC 0.69 mmol | DMF | 120 | 90 | 90 | 14.16 | 33.521 | 33.521 | P-1 |
| Mn(hfac)₂ (O₂CC₆H₅) | Mn(Ac)₂•4H₂O 0.46 mmol Hfac 0.92 mmol bipyridine 0.46 mmol | ether | 90 | 95.32 | 90 | 9.572 | 17.162 | 14.041 | C2/c |
| BPR43G2 | Zn(NO₃)₂•6H₂O 0.0288 mmol H₂BDC 0.0072 mmol | DMF CH₃CN | 90 | 91.37 | 90 | 17.96 | 6.38 | 7.19 | C2/c |
| BPR48A2 | Zn(NO₃)₂ 6H₂O 0.012 mmol H₂BDC 0.012 mmol | DMSO toluene | 90 | 90 | 90 | 14.5 | 17.04 | 18.02 | Pbca |
| BPR49B1 | Zn(NO₃)₂ 6H₂O 0.024 mmol H₂BDC 0.048 mmol | DMSO methanol | 90 | 91.172 | 90 | 33.181 | 9.824 | 17.884 | C2/c |
| BPR56E1 | Zn(NO₃)₂ 6H₂O 0.012 mmol H₂BDC 0.024 mmol | DMSO n-propanol | 90 | 90.096 | 90 | 14.5873 | 14.153 | 17.183 | P2(1)/n |
| BPR68D10 | Zn(NO₃)₂ 6H₂O 0.0016 mmol H₃BTC 0.0064 mmol | DMSO benzene | 90 | 95.316 | 90 | 10.0627 | 10.17 | 16.413 | P2(1)/c |
| BPR69B1 | Cd(NO₃)₂ 4H₂O 0.0212 mmol H₂BDC 0.0428 mmol | DMSO | 90 | 98.76 | 90 | 14.16 | 15.72 | 17.66 | Cc |
| BPR73E4 | Cd(NO₃)₂ 4H₂O 0.006 mmol H₂BDC 0.003 mmol | DMSO toluene | 90 | 92.324 | 90 | 8.7231 | 7.0568 | 18.438 | P2(1)/n |
| BPR76D5 | Zn(NO₃)₂ 6H₂O 0.0009 mmol H₂BzPDC 0.0036 mmol | DMSO | 90 | 104.17 | 90 | 14.4191 | 6.2599 | 7.0611 | Pc |
| BPR80B5 | Cd(NO₃)₂•4H₂O 0.018 mmol H₂BDC 0.036 mmol | DMF | 90 | 115.11 | 90 | 28.049 | 9.184 | 17.837 | C2/c |
| BPR80H5 | Cd(NO₃)₂•4H₂O 0.027 mmol H₂BDC 0.027 mmol | DMF | 90 | 119.06 | 90 | 11.4746 | 6.2151 | 17.268 | P2/c |
| BPR82C6 | Cd(NO₃)₂•4H₂O 0.0068 mmol H₂BDC 0.202 mmol | DMF | 90 | 90 | 90 | 9.7721 | 21.142 | 27.77 | Fdd2 |
| BPR86C3 | Co(NO₃)₂•6H₂O 0.0025 mmol H₂BDC 0.075 mmol | DMF | 90 | 90 | 90 | 18.3449 | 10.031 | 17.983 | Pca2(1) |
| BPR86H6 | Cd(NO₃)₂•6H₂O 0.010 mmol H₂BDC 0.010 mmol | DMF | 80.98 | 89.69 | 83.412 | 9.8752 | 10.263 | 15.362 | P-1 |
| | Co(NO₃)₂ 6H₂O | NMP | 106.3 | 107.63 | 107.2 | 7.5308 | 10.942 | 11.025 | P1 |
| BPR95A2 | Zn(NO₃)₂•6H₂O 0.012 mmol H₂BDC 0.012 mmol | NMP | 90 | 102.9 | 90 | 7.4502 | 13.767 | 12.713 | P2(1)/c |

-continued

| MOF-n | Constituents molar ratio M + L | Solvents | α | β | γ | a | b | c | Space group |
|---|---|---|---|---|---|---|---|---|---|
| CuC$_6$F$_4$O$_4$ | Cu(NO$_3$)$_2$·2.5H$_2$O 0.370 mmol H$_2$BDC(OH)$_2$ 0.37 mmol | DMF chlorobenzene | 90 | 98.834 | 90 | 10.9675 | 24.43 | 22.553 | P2(1)/n |
| Fe Formic | FeCl$_2$·4H$_2$O 0.370 mmol formic acid 0.37 mmol | DMF | 90 | 91.543 | 90 | 11.495 | 9.963 | 14.48 | P2(1)/n |
| Mg Formic | Mg(NO$_3$)$_2$·6H$_2$O 0.370 mmol formic acid 0.37 mmol | DMF | 90 | 91.359 | 90 | 11.383 | 9.932 | 14.656 | P2(1)/n |
| MgC$_6$H$_4$O$_6$ | Mg(NO$_3$)$_2$·6H$_2$O 0.370 mmol H$_2$BDC(OH)$_2$ 0.37 mmol | DMF | 90 | 96.624 | 90 | 17.245 | 9.943 | 9.273 | C2/c |
| Zn C$_2$H$_4$BDC MOF-38 | ZnCl$_2$ 0.44 mmol CBBDC 0.261 mmol | DMF | 90 | 94.714 | 90 | 7.3386 | 16.834 | 12.52 | P2(1)/n |
| MOF-49 | ZnCl$_2$ 0.44 mmol m-BDC 0.261 mmol | DMF CH$_3$CN | 90 | 93.459 | 90 | 13.509 | 11.984 | 27.039 | P2/c |
| MOF-26 | Cu(NO$_3$)$_2$·5H$_2$O 0.084 mmol DCPE 0.085 mmol | DMF | 90 | 95.607 | 90 | 20.8797 | 16.017 | 26.176 | P2(1)/n |
| MOF-112 | Cu(NO$_3$)$_2$·2.5H$_2$O 0.084 mmol o-Br-m-BDC 0.085 mmol | DMF ethanol | 90 | 107.49 | 90 | 29.3241 | 21.297 | 18.069 | C2/c |
| MOF-109 | Cu(NO$_3$)$_2$·2.5H$_2$O 0.084 mmol KDB 0.085 mmol | DMF | 90 | 111.98 | 90 | 23.8801 | 16.834 | 18.389 | P2(1)/c |
| MOF-111 | Cu(NO$_3$)$_2$·2.5H$_2$O 0.084 mmol o-BrBDC 0.085 mmol | DMF ethanol | 90 | 102.16 | 90 | 10.6767 | 18.781 | 21.052 | C2/c |
| MOF-110 | Cu(NO$_3$)$_2$·2.5H$_2$O 0.084 mmol thiophene dicarboxylic acid 0.085 mmol | DMF | 90 | 90 | 120 | 20.0652 | 20.065 | 20.747 | R-3/m |
| MOF-107 | Cu(NO$_3$)$_2$·2.5H$_2$O 0 084 mmol thiophene dicarboxylic acid 0.085 mmol | DEF | 104.8 | 97.075 | 95.206 | 11.032 | 18.067 | 18.452 | P-1 |
| MOF-108 | Cu(NO$_3$)$_2$·2.5H$_2$O 0.084 mmol thiophene dicarboxylic acid 0.085 mmol | DBF/methanol | 90 | 113.63 | 90 | 15.4747 | 14.514 | 14.032 | C2/c |
| MOF-102 | Cu(NO3)2·2.5H2O 0.084 mmol H2(BDCCl2) 0.085 mmol | DMF | 91.63 | 106.24 | 112.01 | 9.3845 | 10.794 | 10.831 | P-1 |
| Clbdc1 | Cu(NO3)2·2.5H2O 0.084 mmol H2(BDCCl2) 0.085 mmol | DEF | 90 | 105.56 | 90 | 14.911 | 15.622 | 18.413 | P-1 |
| Cu(NMOP) | Cu(NO3)2·2.5H2O 0.084 mmol NBDC 0.085 mmol | DMF | 90 | 102.37 | 90 | 14.9238 | 18.727 | 15.529 | P2(1)/m |
| Tb(BTC) | Tb(NO3)2·5H2O 0.033 mmol H3BTC 0.033 mmol | DMF | 90 | 106.02 | 90 | 18.6986 | 11.368 | 19.721 | |
| Zn3(BTC)2 Honk | ZnCl2 0.033 mmol H3BTC 0.033 mmol | DMF ethanol | 90 | 90 | 90 | 26.572 | 26.572 | 26.572 | Fm-3m |
| Zn4O(NDC) | Zn(NO3)2·4H2O 0.066 mmol 14NDC 0.066 mmol | DMF ethanol | 90 | 90 | 90 | 41.5594 | 18.818 | 17.574 | aba2 |
| CdTDC | Cd(NO3)2·4H2O 0.014 mmol thiophene 0.040 mmol DABCO 0.020 mmol | DMF H2O | 90 | 90 | 90 | 12.173 | 10.485 | 7.33 | Pmma |
| IRMOF-2 | Zn(NO3)2·4H2O 0.160 mmol o-Br-BDC 0.60 mmol | DEF | 90 | 90 | 90 | 25.772 | 25.772 | 25.772 | Fm-3m |
| IRMOF-3 | Zn(NO3)2·4H2O 0.20 mmol H2N-BDC 0.60 mmol | DEF ethanol | 90 | 90 | 90 | 25.747 | 25.747 | 25.747 | Fm-3m |
| IRMOF-4 | Zn(NO3)2·4H2O 0.11 mmol [C3H7O]2-BDC 0.48 mmol | DEF | 90 | 90 | 90 | 25.849 | 25.849 | 25.849 | Fm-3m |
| IRMOF-5 | Zn(NO3)2·4H2O 0.13 mmol [C5H11O]2-BDC 0.50 mmol | DEF | 90 | 90 | 90 | 12.882 | 12.882 | 12.882 | Pm-3m |
| IRMOF-6 | Zn(NO3)2·4H2O 0.20 mmol [C2H4]-BDC 0.60 mmol | DEF | 90 | 90 | 90 | 25.842 | 25.842 | 25.842 | Fm-3m |
| IRMOF-7 | Zn(NO3)2·4H2O 0.07 mmol 1,4NDC 0.20 mmol | DEF | 90 | 90 | 90 | 12.914 | 12.914 | 12.914 | Pm-3m |
| IRMOF-8 | Zn(NO3)2·4H2O 0.55 mmol 2,6NDC 0.42 mmol | DEF | 90 | 90 | 90 | 30.092 | 30.092 | 30.092 | Fm-3m |
| IRMOF-9 | Zn(NO3)2·4H2O 0.05 mmol BPDC 0.42 mmol | DEF | 90 | 90 | 90 | 17.147 | 23.322 | 25.255 | Pnnm |
| IRMOF-10 | Zn(NO3)2·4H2O 0.02 mmol BPDC 0.012 mmol | DEF | 90 | 90 | 90 | 34.281 | 34.281 | 34.281 | Fm-3m |
| IRMOF-11 | Zn(NO3)2·4H2O 0.05 mmol HPDC 0.20 mmol | DEF | 90 | 90 | 90 | 24.822 | 24.822 | 56.734 | R-3m |
| IRMOF-12 | Zn(NO3)2·4H2O 0.017 mmol HPDC 0.12 mmol | DEF | 90 | 90 | 90 | 34.281 | 34.281 | 34.281 | Fm-3m |
| IRMOF-13 | Zn(NO$_3$)$_2$·4H$_2$O 0.048 mmol PDC 0.31 mmol | DEF | 90 | 90 | 90 | 24.822 | 24.822 | 56.734 | R-3m |
| IRMOF-14 | Zn(NO$_3$)$_2$·4H$_2$O 0.17 mmol PDC 0.12 mmol | DEF | 90 | 90 | 90 | 34.381 | 34.381 | 34.381 | Fm-3m |
| IRMOF-15 | Zn(NO$_3$)$_2$·4H$_2$O 0.063 mmol TPDC 0.025 mmol | DEF | 90 | 90 | 90 | 21.459 | 21.459 | 21.459 | Im-3m |
| IRMOF-16 | Zn(NO$_3$)$_2$·4H$_2$O 0.0126 mmol TPDC 0.05 mmol | DEF NMP | 90 | 90 | 90 | 21.49 | 21.49 | 21.49 | Pm-3m |

ADC acetylenedicarboxylic acid
NDC naphthalenedicarboxylic acid
BDC benzenedicarboxylic acid
ATC adamantanetetracarboxylic acid
BTC benzenetricarboxylic acid
BTB benzenetribenzoic acid
MTB methanetetrabenzoic acid
ATB adamantanetetrabenzoic acid
ADB adamantanedibenzoic acid Further metal-organic frameworks are MOF-2 to 4, MOF-9, MOF-31 to 36, MOF-39, MOF-69 to 80, MOF103 to 106, MOF-122, MOF-125, MOF-150, MOF-177, MOF-178, MOF-235, MOF-236, MOF-500, MOF-501, MOF-502, MOF-505, IRMOF-1, IRMOF-61, IRMOP-13, IRMOP-51, MIL-17, MIL-45, MIL-47, MIL-53, MIL-59, MIL-60, MIL-61, MIL-63, MIL-68, MIL-79, MIL-80, MIL-83, MIL-85, CPL-1 to 2, SZL-1, which are described in the literature.

Particularly preferred metal-organic frameworks are MIL-53, Zn-tBu-isophthalic acid, Al-BDC, MOF-5, MOF-177, MOF-505, IRMOF-8, IRMOF-11, Cu-BTC, Al-NDC, Al-aminoBDC, Cu-BDC-TEDA, Zn-BDC-TEDA, A-BTC, Cu-BTC, Al-NDC, Mg-NDC, Al-fumarate, Zn-2-methylimidazolate, Zn-2-aminoimidazolate, Cu-biphenyldicarboxylate-TEDA, MOF-74, Cu-BPP, Sc-terephthalate. In particular, however, preference is given to Mg-formate, Mg-acetate and mixtures thereof because of their environmental friendliness. Cu-BTC, Aluminum-fumarate and Zinc 2-methylimidazolate are particularly preferred.

As a particular preferred embodiment the at least one at least bidentate organic compound is derived from a di-, tri- or tetra carboxylic acid or substituted or unsubstituted ring systems:

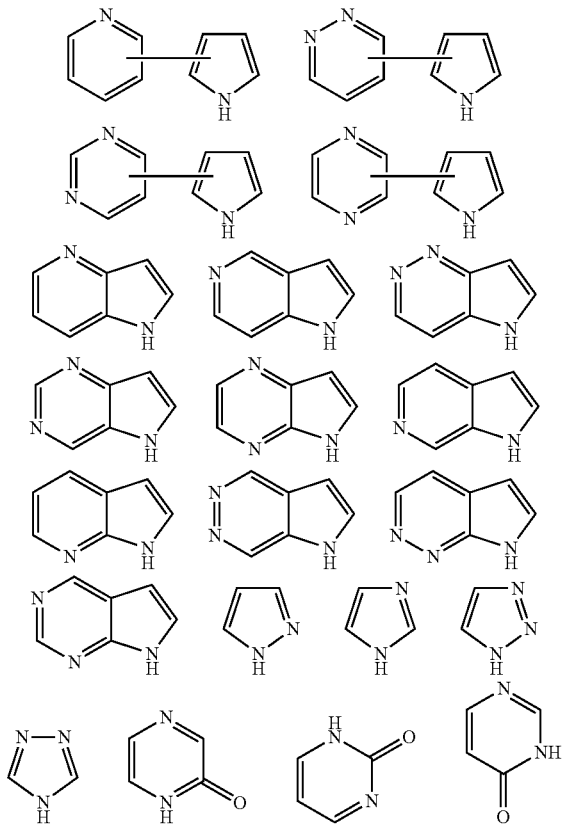

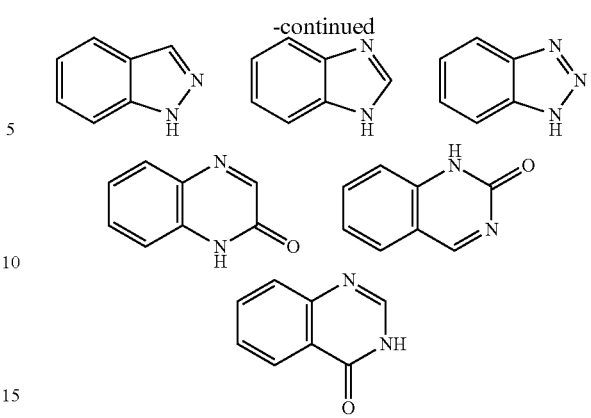

and/or the at least one metal Ion is an ion selected from the group of metals consisting of Mg, Ca, Al, Y, Sc, Zr, Ti, V, Cr, Mo, Fe, Co, Cu, Ni, Zn and a lanthanide.

Even more preferably, the at least one at least bidentate organic compound is derived from a di-, tri- or tetra carboxylic acid or an imidazole and/or the at least one metal ion is an ion selected from the group of metals consisting of Mg, Zr, Zn, Cu and Al (more preferably Zn, Cu and Al).

The term "and/or" combining two options means the first option or the second option or both, the first and the second option.

Examples of suitable metal-organic framework materials are copper-1,3,5-BTC, aluminum fumarate and zinc 2-methylimidazolate.

The additive component (C) may vary based on the application of the film according to the present Invention.

Suitable additives are known to the practitioner In the art. Preferably, the additive component comprises at least one additive selected from the group consisting of electrically or thermally conducting particles, thermoplastic polymers, liquids, surfactants, dispersants, antioxidants, UV absorbers/light stabilizers, metal deactivators, antistatic agents, reinforcing agents, fillers, nucleating agents, antifogging agents, biocides, plasticisers, lubricants, emulsifiers, colorants, pigments, rheology additives, mold release agents, tackifiers, catalysts, flow-control agents, optical brighteners, flame-proofing agents, antidripping agents, and blowing agents.

Preferred additives are electrically conducting particles.

Suitable electrically conducting particles are metals, like titanium, zirconium, hafnium, vanadium, niobium, tantalum, chromium, molybdenum, tungsten, manganese, rhenium, iron, ruthenium, osmium, cobalt, rhodium, iridium, nickel, platinum, palladium, copper, silver, gold, zinc, aluminum, tin, lead, metals from the lanthanide series; metal alloys like steel; carbon materials, like carbon black, activated carbon, graphite, expanded graphite, expandable graphite, carbon fibers, carbon nanotubes, fullerenes, graphene, coal, and coke.

Also preferred additives are thermally conducting particles.

Suitable thermally conducting particles are selected for example from the group consisting of metals, like the metals mentioned as electrically conducting particles, especially silver, copper and iron, boron nitride, aluminum nitride, aluminum oxide, and silicon carbide.

It is clear to a practitioner in the art that an electrically conducting particle may also be used as thermally conducting particle and vice versa based on its material properties. Thus an electrically or thermally conducting particle, like a metal, may be used as electrically conducting particle, as thermally conducting particle or both, electrically and thermally conducting particle.

Also preferred additives are thermoplastics.

Thermoplastics (thermoplastic polymers) are plastics which yield solid materials upon cooling of a polymer melt and soften upon heating, the shaping of a thermoplastic thus being a reversible process. They are normally composed of relatively high molar mass molecules and form the major part of plastics. Examples are vinylaromatic polymers, like polystyrene (including high impact polystyrene), acrylonitrile/butadiene/styrene (ABS) and styrene/acrylonitrile polymers (SAN); poly(phenylene oxide) (PPO), PPO-polyamide alloys, polyethersulfones (PESU), polysulfones (PSU), polyphenylsulfones (PPSU; PPSF), polyetherketones (PEK), polyetheretherketones (PEEK), polyolefins, ethylene/vinyl alcohol (EVOH) copolymers, polyimides, polyacetals, like polyoxymethylenes (POM); polyetherimides, fluoropolymers, fluorinated ethylene propylene polymers (FEP), poly(vinyl fluoride), poly(vinylidene fluoride), poly(vinylidene chloride), poly(vinyl chloride), poly(acrylonitrile), polycarbonates (PC), polyamides, thermoplastic polyurethanes (TPU), polyesters, such as poly(butylene terephthalate) (PBT), poly(ethylene terephthalate) (PET), poly(1,3-propylene terephthalate) (PPT), poly(ethylene naphthalate) (PEN), and poly(cyclohexanedimethanol terephthalate) (PCT); and liquid crystalline polymers (LCP).

Suitable conventional additives comprise for example surfactants, dispersants, antioxidants, UV absorbers/light stabilizers, metal deactivators, antistatic agents, reinforcing agents, fillers, nucleating agents, antifogging agents, biocides, plasticisers, lubricants, emulsifiers, colorants, pigments, rheology additives, mold release agents, tackifiers, catalysts, flow-control agents, optical brighteners, flameproofing agents, antidripping agents, and blowing agents and the like.

The choice of suitable additives depends in each case on the specific nature of the film as well as on the end use of the film to be produced and can be established by the skilled person.

Further details concerning the abovementioned additives are available in the technical literature, e.g. Plastics Additive Handbook, 5th edition, H. Zweifel (Ed.), Hanser Publishers, Munich, 2001.

Suitable fillers or reinforcing agents comprise, for example, pigments, calcium carbonate, silicates, talc, mica, kaolin, bentonite, barium sulfate, metal oxides and metal hydroxides, wood flour and fine powders or fibers of other natural products, and synthetic fibers. Examples of suitable fibrous or pulverulent fillers further include carbon fibers or glass fibers in the form of glass fabrics, glass mats or filament glass rovings, chopped glass, glass beads, and wollastonite and the like.

Examples for lubricants are metal soap, such as calcium stearate, magnesium stearate or zinc stearate, butyl stearate, palmityl stearate, glycerol monostearate, ethylene bisstearyl amide, methylene bisstearyl amide, palmitic amide, stearic acid, behanic acid, polyethylene wax and the like.

Preferably, the additive component comprises carbon black.

A further aspect of the invention is a composition, preferably in dry form, comprising (A) from 51 wt.-% to 99.9 wt.-% based on the total weight of the composition of at least one porous metal-organic framework material, the material comprising at least one at least bidentate organic compound coordinated to at least one metal ion; (B) from 0.1 wt.-% to 49 wt.-% based on the total weight of the composition of a fluoropolymer capable of processing-induced fibrillation; and (C) 0 wt.-% to 48.9 wt.-% based on the total weight of the composition of an additive component.

This composition can be used as starting material for the preparation of the film.

Preferred aspects of the composition of the present invention are those described for the film of the invention above, as far as the components (A), (B) and (C) are concerned.

A fluoropolymer capable of processing-induced fibrillation refers to a fluoropolymer which is already at least partly or fully fibrillated or can be fibrillated in a later processing step.

A further aspect of the present invention is a method of preparing a film of the present invention, comprising the steps of (a) preparing a composition as described above;
(b) converting the composition into the film.

Preferably, step (a) includes a fibrillation step. Furthermore is preferred that components (A) and optionally (C) can be mixed with component (B) in unfibrillated form and the resulting mixture is then subjected to fibrillation of component (B). Alternatively, the fibrillated component (B) is mixed with components (A) and optionally (B). The converting in step (b) can comprise a calendering step.

In general it is possible to prepare the composition in step (a) by adding component (B) in at least partly fibrillated form. Furthermore it is possible to carry out the fibrillation step at least partly in step (a) and/or in step (b). Thus it is possible that fibrillation occurs before step (a), during step (a) and/or during step (b).

Typically, the preparation of the composition in step (a) includes a mixing step. A suitable mixer is any mixer or kneader that can subject the mixture to sufficient shear forces to fibrillate the fluoropolymer at the desired processing temperature. Exemplary commercially available batch mixers include the Banbury mixer, the Mogul mixer, the C. W. Brabender Prep mixer, and C. W. Brabender sigma-blade mixer. Known mixer types are Ribbon Blender V Blender, Continuous Processor, Cone Screw Blender, Screw Blender, Double Cone Blender, Double Planetary, High Viscosity Mixer, Counter-rotating, Double & Triple Shaft, Vacuum Mixer, High Shear Rotor Stator, Dispersion Mixers, Paddle, Jet Mixer, Mobile Mixers, Drum Blenders, banbury mixer, intermix mixer, Planetary mixer.

Step (b) refers to the conversion of the composition to the film. Suitable processes for producing the film are for example ram extrusion, piston extrusion, film extrusion by single or double screw extruders, extrusion followed by a forming process (thermoforming, vacuum forming), calendering, pressing, hotpressing, lamination, injection molding, compression molding, blow molding, rotomolding and the like. Optionally, the film producing step can be followed by a stretching step to orient the fibrillated fluoropolymer for greater strength.

A further aspect of the present invention is the use of a film according to the present invention as a sensor, especially moisture sensor, a conductive film, a storage or separation device.

In principle, the film of the present invention can be used as any other suitable film.

Accordingly the film can be used as a selective sensor for chemical vapors and gases, as optical sensor or as surface plasmon resonance sensor as described by O. Shekhah et al., Chem. Soc. Rev., 2011, 40, 1081-1106. A detailed review of chemical sensors is given by L. E. Keno et al., Chem. Rev. 2012, 112, 1105-1125.

Accordingly a further aspect of the present Invention is a sensor comprising a film of the present invention.

As a conductive film it is possible to use the film of the present invention as electrical or thermal conductor. Such applications include the use as electrodes or double layer conductors as described in U.S. Pat. No. 6,631,074 B2, U.S. Pat. No. 6,359,769 B1, U.S. Pat. No. 7,175,783 B2 or US 2010/0014215 A1.

Accordingly, a further aspect of the present invention is an electrode or conductor comprising a film of the present Invention.

The film of the present Invention can also be used as storage and separation device. Accordingly, any storage or separation application for metal-organic framework materials known in the art can also be used with a film of the present invention.

Especially, the use as storage and separation device includes the use of a porous metal organic framework in the film according to the invention for the uptake of at least one substance for the purposes of its storage, separation and controlled release. Here the film can be part of a filter or membrane or the like. An example for a cleaning filter is described in JP-H105545 A. Membranes are described in US 2003/219587.

Accordingly a further aspect of the present invention is a storage or separation device, like a membrane or filter, comprising a film of the present invention.

A further use is in a chemical reaction. Accordingly a further aspect of the invention is chemical reactor comprising a film of the present invention.

The at least one substance is preferably a gas or a gas mixture. Liquids are also possible.

Processes for storage by means of metal organic frameworks in general are described in WO-A 2005/003622, WO-A 2003/064030, WO-A 2005/049484, WO-A 2006/089908 and DE-A 10 2005 012 087. The processes described there can also be used for the metal organic framework of the invention. Preferred gases for storage are methane or hydrogen.

Processes for separation or purification by means of metal organic frameworks in general are described in EP-A 1 674 555, DE-A 10 2005 000938 and the German patent application number DE 10 2005 022 844. The processes described there can also be used for the film of the invention.

If the film of the invention is used for storage, this preferably takes place in a temperature range from −200° C. to +80° C. A greater preference is given to a temperature range from −40° C. to +80° C. A preferred pressure range is from 20 bar to 1000 bar (absolute), in particular from 100 bar to 400 bar.

For the purposes of the present invention, the terms "gas" and "liquid" are used in the Interests of simplicity, but gas mixtures and liquid mixtures or liquid solutions are likewise encompassed by the term "gas" or "liquid", respectively.

Preferred gases are hydrogen, natural gas, town gas, hydrocarbons, in particular methane, ethane, ethene, acetylene, propane, n-butane and i-butane, carbon monoxide, carbon dioxide, nitrogen oxides, oxygen, sulfur oxides, halogens, halogenated hydrocarbons, $NF_3$, $SF_6$, ammonia, boranes, phosphanes, hydrogen sulfide, amines, formaldehyde, noble gases, in particular helium, neon, argon, krypton and xenon.

The gas is particularly preferably carbon dioxide which is separated off from a gas mixture comprising carbon dioxide. The gas mixture preferably comprises carbon dioxide together with at least $H_2$, $CH_4$ or carbon monoxide. In particular, the gas mixture comprises carbon dioxide together with carbon monoxide.

Preference is also given to the use of the film of the invention for storage of methane at a pressure In the range of from 1 bar (absolute) to 17 bar (absolute), more preferably from 3 bar (absolute) to 100 bar (absolute), more preferably from 3 bar (absolute) to 200 bar (absolute), more preferably from 3 bar (absolute) to 250 bar (absolute). Preference is also given to the use of the film of the invention for storage of hydrogen at a pressure in the range of from 3 bar (absolute) to 100 bar (absolute), more preferably from 3 bar (absolute) to 350 bar (absolute), more preferably from 3 bar (absolute) to 700 bar (absolute).

However, the at least one substance can also be a liquid. Examples of such a liquid are disinfectants, inorganic or organic solvents, fuels, in particular gasoline or diesel, hydraulic fluids, radiator fluids, brake fluids or an oil, in particular machine oil. Furthermore, the liquid can be a halogenated aliphatic or aromatic, cyclic or acyclic hydrocarbon or a mixture thereof. In particular, the liquid can be acetone, acetonitrile, aniline, anisole, benzene, benzonitrile, bromobenzene, butanol, tert-butanol, quinoline, chlorobenzene, chloroform, cyclohexane, diethylene glycol, diethyl ether, dimethylacetamide, dimethylformamide, dimethyl sulfoxide, dioxane, glacial acetic acid, acetic anhydride, ethyl acetate, ethanol, ethylene carbonate, ethylene dichloride, ethylene glycol, ethylene glycol dimethyl ether, formamide, hexane, isopropanol, methanol, methoxypropanol, 3-methyl-1-butanol, methylene chloride, methyl ethyl ketone, N-methylformamide, N-methylpyrrolidone, nitrobenzene, nitromethane, piperidine, propanol, propylene carbonate, pyridine, carbon disulfide, sulfolane, tetrachloroethene, carbon tetrachloride, tetrahydrofuran, toluene, 1,1,1-trichloroethane, trichloroethylene, triethylamine, triethylene glycol, triglyme, water or a mixture thereof.

The at least one substance can also be an odorous substance.

The odorous substance is preferably a volatile organic or Inorganic compound which comprises at least one of the elements nitrogen, phosphorus, oxygen, sulfur, fluorine, chlorine, bromine or iodine or an unsaturated or aromatic hydrocarbon or a saturated or unsaturated aldehyde or a ketone. More preferred elements are nitrogen, oxygen, phosphorus, sulfur, chlorine, bromine; and particular preference is given to nitrogen, oxygen, phosphorus and sulfur.

In particular, the odorous substance is ammonia, hydrogen sulfide, sulfur oxides, nitrogen oxides, ozone, cyclic or acyclic amines, thiols, thioethers and also aldehydes, ketones, esters, ethers, acids or alcohols. Particular preference is given to ammonia, hydrogen sulfide, organic acids (preferably acetic acid, propionic acid, butyric acid, isobutyric acid, valeric acid, isovaleric acid, caproic acid, heptanoic acid, lauric acid, pelargonic acid) and cyclic or acyclic hydrocarbons which comprise nitrogen or sulfur and also saturated or unsaturated aldehydes such as hexanal, heptanal, octanal, nonanal, decanal, octenal or nonenal and in particular volatile aldehydes such as butyraldehyde, propionaldehyde, acetaldehyde and formaldehyde and also fuels such as gasoline, diesel (constituents).

The odorous substances can also be fragrances which are used, for example, for producing perfumes. Examples of fragrances or oils which release such fragrances are: essential oils, basil oil, geranium oil, mint oil, cananga oil, cardamom oil, lavender oil, peppermint oil, nutmeg oil, Camilla oil, eucalyptus oil, rosemary oil, lemon oil, lime oil, orange oil, bergamot oil, muscatel sage oil, coriander oil, cypress oil, 1,1-dimethoxy-2-phenylethane, 2,4-dimethyl-4- phenyltetrahydrofuran, dimethyltetrahydrobenzaldehyde, 2,6-dimethyl-7-octen-2-ol, 1,2-diethoxy-3,7-dimethyl-2,6-octadiene, phenylacetaldehyde, rose oxide, ethyl-2-methyl-pentanoate, 1-(2,6,6-trimethyl-1,3-cyclohexadien-1-yl)-2-buten-1-one, ethyl vanillin, 2,6-dimethyl-2-octenol, 3,7-dimethyl-2-octenol, tert-butylcyclohexyl acetate, anisyl acetate, allyl cyclohexyloxyacetate, ethyl-linalool, eugenol, coumarin, ethyl acetoacetate, 4-phenyl-2,4,6-trimethyl-1,3-dioxane, 4-methylene-3,5,6,6-tetramethyl-2-heptanone, ethyl tetrahydrosafranate, geranyl nitrile, cis-3-hexen-1-ol, cis-3-hexenyl acetate, cis-3-hexenyl methyl carbonate, 2,6-dimethyl-5-hepten-1-al, 4-(tricyclo[5.2.1.0]decylidene)-8-butanal, 5-(2,2,3-trimethyl-3-cyclopentenyl)-3-methylpentan-2-ol, p-tert-butyl-alpha-methylhydrocinnamaldehyde, ethyl[5.2.1.0]tricyclodecanecarboxylate, geraniol, citronellol, citral, linalool, linalyl acetate, ionone, phenylethanol and mixtures thereof.

For the purposes of the present invention, a volatile odorous substance preferably has a boiling point or boiling range below 300° C. The odorous substance is more preferably a readily volatile compound or mixture. The odorous substance particularly preferably has a boiling point or boiling range below 250° C., more preferably below 230° C., particularly preferably below 200° C.

Preference is likewise given to odorous substances which have a high volatility. The vapor pressure can be employed as a measure of the volatility. For the purposes of the present invention, a volatile odorous substance preferably has a vapor pressure of more than 0.001 kPa (20° C.). The odorous substance is more preferably a readily volatile compound or mixture. The odorous substance particularly preferably has a vapor pressure of more than 0.01 kPa (20° C.), more preferably a vapor pressure of more than 0.05 kPa (20° C.). Particular preference is given to the odorous substances having a vapor pressure of more than 0.1 kPa (20° C.).

The at least one substance is preferably water, regardless whether in gaseous or liquid form.

An example in which a chemical reaction can take place in the presence of the film of the Invention is the alkoxylation of monools or polyols. The procedure for carrying out such alkoxylations is described in WO-A 03/035717 and WO-A 2005/03069. The porous metal organic framework of the invention can likewise be used for epoxidation and for preparing polyalkylene carbonates and hydrogen peroxide. Such reactions are described In WO-A 03/101975, WO-A 2004/037895 and US-A 2004/081611.

Particular preference is given to catalytic reactions.

EXAMPLES

Figure 1:
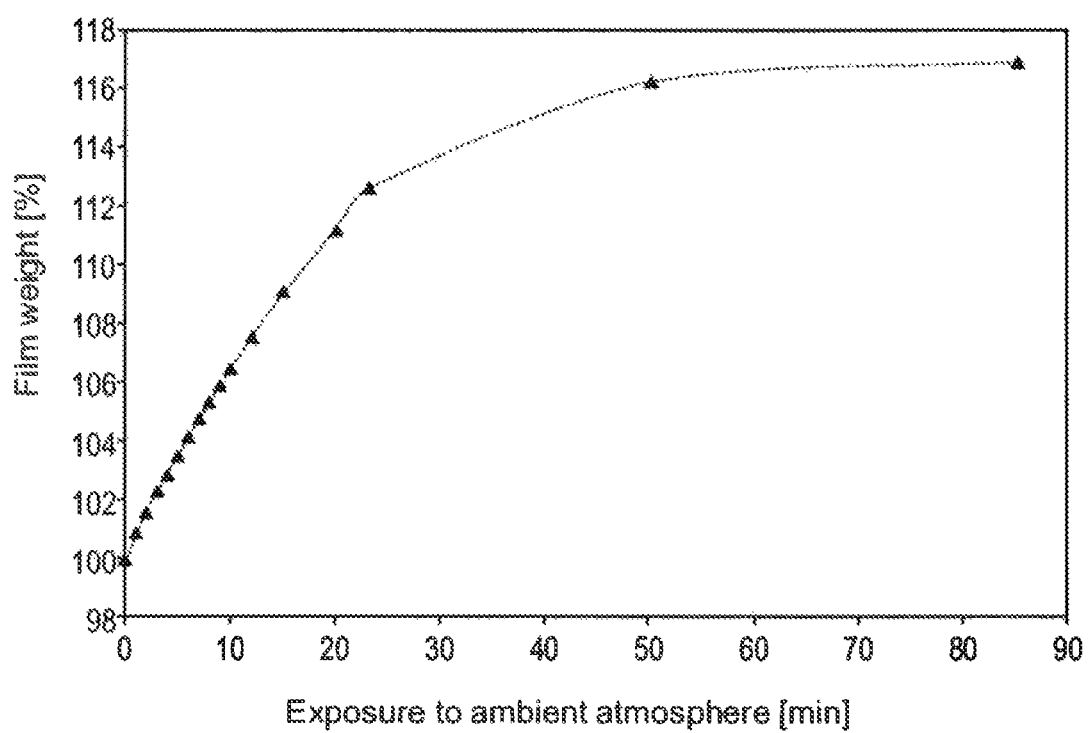
FIG. 1 shows the increase of the weight of a film of the invention as a function of the exposure to ambient atmosphere.

Example 1: Fabrication of a Metal-Organic Framework Material (MOF) Film (Copper Benzenetricarboxylate MOF, C300)

900 mg of commercially available metal-organic framework powder (Basolite C300, BASF SE) and 100 mg of poly(tetrafluoroethylene) powder (DuPont, Teflon 6CN X-EF) were placed in a mortar and mixed. By this, weight percentages based on the total weight of the film of 90% (A) and 10% (B) were adjusted.

After an Intimate powder mixture was obtained pressure then was applied to the pestel in order to induce fibrillation of the poly(tetrafluoroethylene) component.

After a homogenous light blue putty-like mass was obtained the obtained material was transferred to a calender and formed into a free-standing flexible film. The gap of the calender was used to progressively decrease the thickness of the film to a final level of 300 μm as determined by a thickness gage (Digimatic Indicator TYPE ID-110M, Mitutoyo). The obtained light blue film was trimmed into a rectangular geometry (2.6 cm×2.4 cm) with a blade and its weight was determined to be 213.6 mg using a laboratory balance. The film density can thus be calculated and was found to be 1.14 g/cm$^3$ The specific surface area of the film was 361 m$^2$/g measured by nitrogen physisorption at −196.15° C. (Gemini V 2365, Micromeritics) and calculated using the Brunauer-Emmett-Teller method (according to DIN ISO 9277:2003-05). Using the film density the volumetric specific surface area of the film was calculated to be 412 m$^2$/cm$^3$.

Example 2a: Fabrication of a Thin MOF Film (Aluminum Fumarate MOF, A520)

The same procedure and equipment as in Example 1 was used.

276 mg of commercially available metal-organic framework powder (Basolite A520, BASF SE) and 31.2 mg of poly(tetrafluoroethylene) powder (DuPont, Teflon 6CN X-EF) were used resulting in weight percentages based on the total weight of the film of 90% (A) and 10% (B).

A free-standing flexible white film with a thickness of 52 μm and a film density of 1.20 g/cm$^3$ was obtained. The specific surface area of the film was 422 m$^2$/g and the volumetric specific surface area of the film was calculated to be 506 m$^2$/cm$^3$.

Example 2 b Fabrication of a Thick MOF Film (Aluminum Fumarate MOF, A520)

The same procedure and equipment as In Example 1 was used. 950 mg of commercially available metal-organic framework powder (Basolite A520, BASF SE) and 50 mg of poly(tetrafluoroethylene) powder (DuPont, Teflon 6CN X-EF) were used resulting In weight percentages based on the total weight of the film of 95% (A) and 5% (B).

A free-standing flexible white film with a thickness of 345 μm and a film density of 0.78 g/cm$^3$ was obtained. The specific surface area of the film was 738 m$^2$/g and the volumetric specific surface area of the film was calculated to be 576 m$^2$/cm$^3$.

Example 3: Fabrication of a Mixed MOF Film (C300/A520)

The same procedure and equipment as In Example 1 was used.

254.0 mg of metal-organic framework powder 1 (Basolite C300, BASF SE), 254.4 mg of metal organic framework powder 2 (Basolite A520, BASF SE) and 27.1 mg of poly(tetrafluoroethylene) powder (DuPont, Teflon 6CN X-EF) were resulting in weight percentages based on the total weight of the film of 47.4% (A1), 47.5% (A2) and 5.1% (B). Thus the weight percentage of component (A) Is 94.9%.

A free-standing flexible light blue film with a thickness of 95 μm and a film density of 1.05 g/cm³ was obtained. The specific surface area of the film was 180 m²/g and the volumetric specific surface area of the film was calculated to be 189 m²/cm$^a$.

Example 4: Fabrication of a ZIF 8 Film (Zinc 2-Methylimidazolate MOF, Z1200)

The same procedure and equipment as in Example 1 was used.

478.2 mg of commercially available metal-organic framework powder (Basolite Z1200, BASF SE) and 25.1 mg of poly(tetrafluoroethylene) powder (DuPont, Teflon 6CN X-EF) were used resulting in weight percentages based on the total weight of the film of 95% (A) and 5% (B).

A free-standing flexible white film with a thickness of 51 μm and a film density of 0.72 g/cm³ was obtained. The specific surface area of the film was 1068 m²/g and the volumetric specific surface area of the film was calculated to be 769 m²/cm³.

Example 5: Fabrication of a MOF/Carbon Black Composite Film

The same procedure and equipment as in Example 1 was used.

453.0 mg of metal-organic framework powder (Basolite C300, BASF SE), 61.2 mg of poly(tetrafluoroethylene) and 90.8 mg of carbon black (Printex XPB 538, Orion Engineered Carbons) powder (DuPont, Teflon 6CN X-EF) were used resulting in weight percentages based on the total weight of the film of 75% (A), and 10% (B) and 15% (C).

A free-standing flexible black film with a thickness of 115 μm and a film density of 1.4 g/cm³ was obtained.

Example 6: Fabrication of a MOF Humidity Sensor

The light blue film obtained in Example 1 was placed into a vacuum drying chamber for 15 minutes at 80° C. It was found that desorption of adsorbed humidity resulted in the activation of the metal-organic framework component of the film. During this process the film changed its color from light blue into dark blue. The film was quickly transferred to a laboratory balance and the balance was tared. Over a few minutes a continuous increase in weight was observed due to the re-adsorption of humidity from the ambient atmosphere while the film changed again its color to light blue. FIG. 1 shows the weight increase of the film within a time frame of approximately 1 to 1.5 hours. The effect was found to be fully reversible over a repeated number of adsorption/desorption cycles.

Example 7: Fabrication of a Heatable MOF/Carbon Black Film (Combined Electrical/Thermal Sensor)

The film obtained in Example 5 was trimmed into a rectangular geometry (2.1 cm×1.0 cm). An electrically conductive silver paint ("Dosilac", Amidoduco) was coated around two opposite edges of the film and thin metal contacts (nickel foil, Alfa Aesar, 30 μm) were glued onto the film.

The metal contacts of the film were connected with two alligator clips in series to a multimeter (Metrahit, GMC-I Gossen-Metrawatt GmbH, Nürnberg/Germany) and a laboratory voltage source (EA-PS 3016-40 B, Elektro-Automatik GmbH, Viersen/Germany). A voltage of 16 V was adjusted and electrical current was allowed to flow through the film.

The resulting average electrical power was determined by the multimeter to be 41 mA. By this, the electrical resistance was calculated to be 387 Ohm.

The temperature of the film was measured by a contactless infrared camera (FLIR i60, Orglmeister Infrarot-Systeme, Walluf/Germany) which was also used to visualize the heating of the film.

Figure 2:
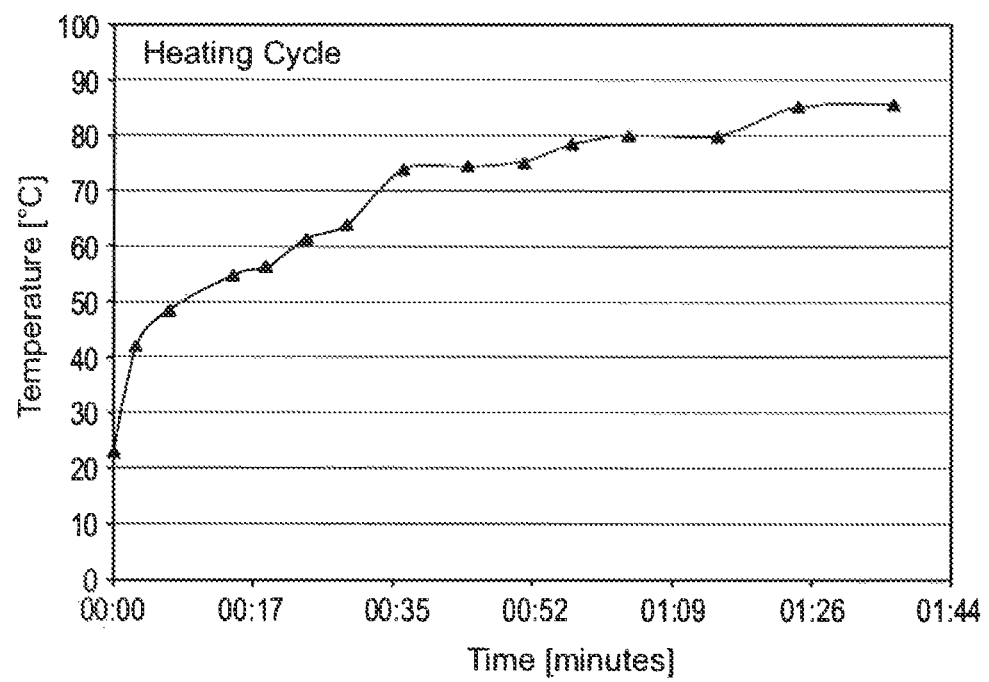
FIG. 2 shows a heating a cooling cycle of a film of the invention as a function of the time when subjecting to electric power (heating cycle) and after termination of current flow (cooling cycle).
Figure 2:
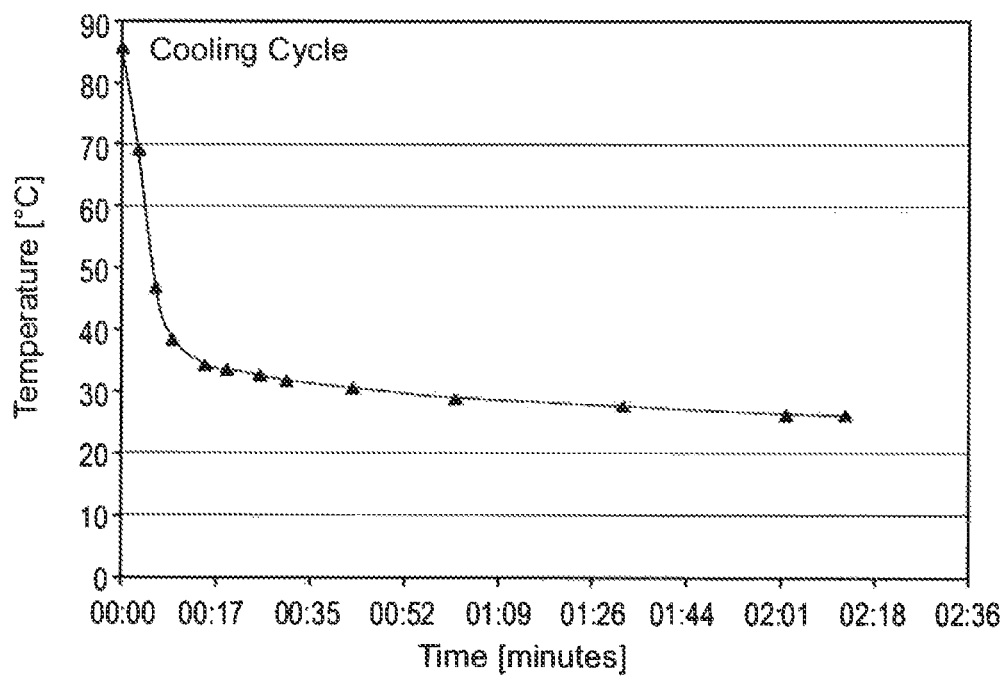

An average temperature level of 85.7° C. was achieved after 97 s. Once the voltage was cut the temperature decreased again to 26.5° C. after 136 s. FIG. 2 shows the respective curves of temperature increase (heating cycle) and decrease (cooling cycle).

The effect was found to be fully reversible over a repeated number of heating/cooling cycles.

Example 8: Application of a MOF Film as Recyclable Drying Agent

The water uptake of the film obtained from example 2a was measured as the increase in weight over that of the dry film. The water adsorption/desorption isotherm was performed on a VTI SA instrument from TA Instruments following a step-isotherm program. The experiment consisted of a run performed on a sample material that has been placed on the microbalance pan inside of the instrument. Before the measurement was started, the residual moisture of the sample was removed by heating the sample to 100° C. (heating ramp of 5° C./min) and holding it for 6 h under a nitrogen flow. After the drying program, the temperature in the cell was decreased to 25° C. and kept isothermal during the measurement. The microbalance was calibrated, and the weight of the dried sample was balanced (maximum mass deviation 0.01 wt.-%). Water uptake by the sample was measured as the increase in weight over that of the dry sample. First, as adsorption curve was measured by increasing the relative humidity (RH) (expressed as wt.-% water in the atmosphere inside of the cell) to which the sample was exposed and measuring the water uptake by the sample as equilibrium. The RH was increased with a step of 10 wt.-% from 5% to 85% and at each step the system controlled the RH and monitored the sample weight until reaching the equilibrium conditions after the sample was exposed from 85 wt.-% to 5 wt.-% with a step of 10% and the change in the weight of the sample (water uptake) was monitored and recorded.

Figure 3:
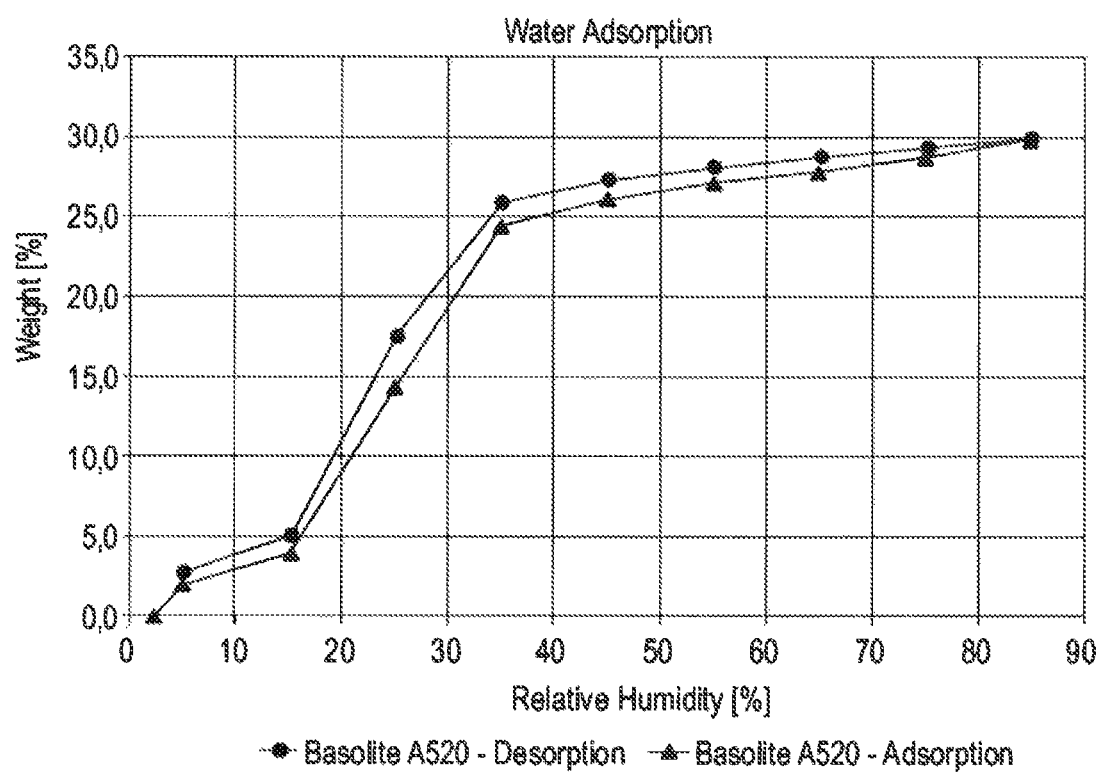
FIG. 3 shows the water adsorption of a film according to the invention as a function of the relative humidity.

The total water uptake by weight at RH 85% was 30%. The water isotherm is displayed in FIG. 3. The shape of the isotherm demonstrates a reversible water-uptake and release behaviour of the MOF film, a prerequisite for the usage as recyclable drying agent.

Example 9: Fabrication of a Large MOF Film and a MOF Roll for Gas Storage 232.6 g of metal-organic framework powder (Basolite C300, BASF SE), 5.96 g of poly(tetrafluoroethylene) powder (DuPont, Teflon 6CN X-EF) and 20 agate grinding beads (diameter 2.0 cm, equal to 208.0 g) were placed in a 1000 mL plastic vessel. By this, a weight ratio of 97.5/2.5 of metal-organic framework to poly(tetrafluoroethylene) was adjusted.

The sealed plastic vessel was treated for 12 h on a pair of cylindrical rollers. Thereby an intimate powder mixture was obtained. The mixture was transferred in portions to a mortar where it was further mixed. Complete fibrillation of the poly(tetrafluoroethylene) component was achieved by application of pressure to the pestel.

The resulting homogenous light blue putty-like mass was transferred to a calender and formed into a free-standing flexible film (0.75 mm thickness) which was trimmed into a strip-like geometry with a blade (14.5 cm width×160 cm length, total film weight before drying 145.1 g, total film weight after drying 110.8 g). Two strips of plastic fabric (4.5 g) were cut into the same dimension and placed on top and below of the MOF film. After this, the three layers were tightly wrapped into a roll-like geometry which was fixed with scotch tape (0.3 g) such that the plastic fabric separated the MOF layers from each other. The diameter of the roll was 4.5 cm. The film density was calculated to be 0.64 g/cm³. Upon vacuum drying at 80° C. It was found that the color of the roll changed from light blue into dark blue.

The gravimetric specific surface area of the film was 924 m²/g and the volumetric specific surface area of the film was calculated to be 588 m²/cm³.

Uptake of Methane

The uptake of methane was measured in the following way:

The obtained roll was placed in a steel container which was tightly sealed, followed by evacuation at oil pump vacuum. The container was then placed in an overhead container and connected to a methane pressure reservoir. A certain pressure of methane was applied by opening a valve connected to the steel container. The valve was closed and the weight of the complete container was measured as soon as no change in temperature was observable anymore (~21° C., isotherm). The data are shown in the following Table:

| absolute pressure container [bar] | CH₄ uptake [g CH₄/L Tank] |
|---|---|
| 0 | 0 |
| 5.2 | 22.47 |
| 11.60 | 37.81 |
| 15.40 | 43.81 |
| 20.00 | 50.25 |
| 24.00 | 55.99 |
| 51.30 | 77.56 |
| 101.50 | 112.71 |
| 152.20 | 143.24 |
| 200.40 | 169.24 |

Example 10: Quantification of Reversible Water Adsorption and Desorption with Heatable MOF/Carbon Black Film According to the procedure given in Example 5, a MOF/Carbon Black film of identical composition was prepared with a final thickness of 63 μm and a weight of 24 mg. It was trimmed into a rectangular geometry (2.1 cm×1.4 cm). An electrically conductive silver paint ("Dosilac", Amidoduco) was coated around two opposite edges of the film and thin metal contacts (nickel foil, Alfa Aesar, 30 μm) were glued onto the film. The metal contacts of the film were connected with two thin copper wires in series to a multimeter (Metrahit, GMC-I Gossen-Metrawatt GmbH, Nürnberg/Germany) and a laboratory voltage source (EA-PS 3016-40 B, Elektro-Automatik GmbH, Viersen/Germany). The film was put onto a sample holder which was placed itself on a laboratory balance.

By this experimental setup the weight change of the film was monitored as a function of applied voltage and hence increase or decrease in temperature. As a result humidity adsorbed within the film was desorbed within short time (<2 min) when the voltage (16 V) was switched on (average temperature of the film 74° C.). After desorption of the total humidity contained in the film its weight remained constant. After the voltage was switched off the weight of the film recovers to the original level due to re-adsorption of humidly from the ambient air. The process was found to be fully reversible and revealed good reproducibility. The amount of humidity which could be adsorbed and desorbed corresponds to approximately 10 wt-% with respect to the total weight of the film.

The invention claimed is:

1. A porous film comprising
   (A) from 51 wt.-% to 99.9 wt.-% based on the total weight of the film of at least one porous metal-organic framework material, the material comprising at least one at least bidentate organic compound coordinated to Al;
   (B) from 0.1 wt.-% to 49 wt.-% based on the total weight of the film of at least one fibrillated fluoropolymer; and
   (C) 0 wt.-% to 48.9 wt.-% based on the total weight of the film of an additive component,
   wherein the film is freestanding and flexible;
   and wherein the film has a specific surface area of at least 250 m²/g measured according to BET and a volumetric specific surface area of at least 15 m²/cm³.

2. The film of claim 1, wherein the at least one fibrillated fluoropolymer is selected from the group of polymers and copolymers consisting of trifluoroethylene, hexafluoropropylene, monochlorotrifluoroethylene, dichlorodifluoroethylene, tetrafluoroethylene, perfluorobutyl ethylene, perfluoro (alkyl vinyl ether), vinylidene fluoride, and vinyl fluoride and blends thereof.

3. The film of claim 2, wherein the at least one fibrillated fluoropolymer is a fibrillated polytetrafluoroethylene.

4. The film of claim 1, wherein the film has a thickness of at least 0.5 μm.

5. The film of claim 1, wherein the film has a two-dimensional surface with at least one dimension which exceeds 1 cm.

6. The film of claim 1, wherein the specific surface area of the film measured according to BET is at least 500 m²/g.

7. The film of claim 1, wherein the volumetric specific surface area of the film is at least 506 m²/cm³.

8. The film of claim 1, wherein the amounts based on the total weight of the film are 51 wt.-% to 99.9 wt.-% of (A), 0.1 wt.-% to 49 wt.-% of (B) and 0 wt.-% of (C).

9. The film of claim 1, wherein the amounts based on the total weight of the film are 51 wt.-% to 99.8 wt.-% of (A), 0.1 wt.-% to 48.9 wt.-% of (B) and 0.1 to 48.9 wt.-% of (C).

10. The film of claim 1, wherein the at least one at least bidentate organic compound is derived from a di-, tri- or tetra carboxylic acid or substituted or unsubstituted ring systems:

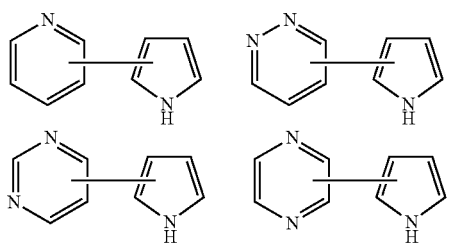

-continued

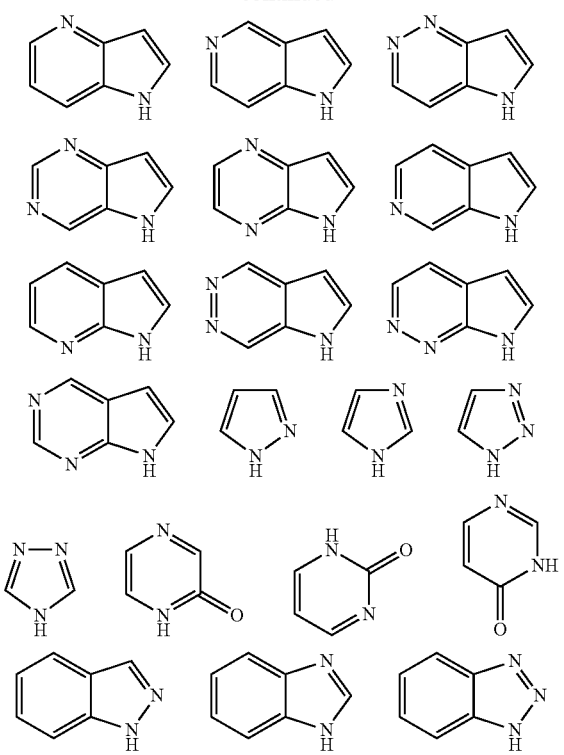

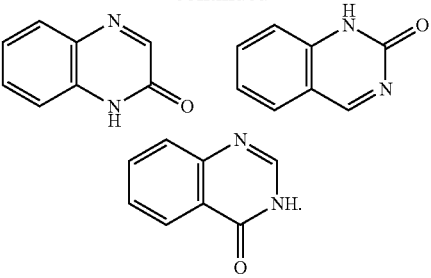

11. The film of claim 1, wherein the at least one at least bidentate organic compound is derived from fumaric acid.

12. The film of claim 1, wherein the additive component comprises at least one additive selected from the group consisting of electrically or thermally conducting particles, thermoplastic polymers, liquids, surfactants, dispersants, antioxidants, UV absorbers/light stabilizers, metal deactivators, antistatic agents, reinforcing agents, fillers, nucleating agents, antifogging agents, biocides, plasticisers, lubricants, emulsifiers, colorants, pigments, rheology additives, mold release agents, tackifiers, catalysts, flow-control agents, optical brighteners, flameproofing agents, antidripping agents, and blowing agents.

13. A sensor, a conductive film, a storage or separation device which comprises the film as claimed in claim 1.

14. A chemical reaction which comprises the film as claimed in claim 1.

* * * * *